(12) United States Patent
Rhee et al.

(10) Patent No.: US 12,456,770 B2
(45) Date of Patent: Oct. 28, 2025

(54) BATTERY MODULE AND BATTERY PACK HAVING THE SAME

(71) Applicant: SK Innovation Co., Ltd., Seoul (KR)

(72) Inventors: Seo Roh Rhee, Daejeon (KR); Yang Kyu Choi, Daejeon (KR); Eun Jeong Choi, Daejeon (KR); Young Sun Choi, Daejeon (KR)

(73) Assignee: SK ON CO., LTD., Seoul (KR)

( * ) Notice: Subject to any disclaimer, the term of this patent is extended or adjusted under 35 U.S.C. 154(b) by 102 days.

(21) Appl. No.: 17/524,546

(22) Filed: Nov. 11, 2021

(65) Prior Publication Data
US 2022/0158281 A1    May 19, 2022

(30) Foreign Application Priority Data

Nov. 13, 2020  (KR) .................. 10-2020-0152191
Nov. 13, 2020  (KR) .................. 10-2020-0152192

(51) Int. Cl.
*H01M 50/183* (2021.01)
*H01M 50/105* (2021.01)
*H01M 50/547* (2021.01)

(52) U.S. Cl.
CPC ....... *H01M 50/183* (2021.01); *H01M 50/105* (2021.01); *H01M 50/547* (2021.01)

(58) Field of Classification Search
CPC ............. H01M 50/183; H01M 50/105; H01M 50/547; H01M 50/186; H01M 10/613;
(Continued)

(56) References Cited

U.S. PATENT DOCUMENTS 9,225,035 B1 *  12/2015  Werre ................ H01M 50/516
2011/0091764 A1    4/2011  Kim
(Continued)

FOREIGN PATENT DOCUMENTS

KR   10-2009-0030202 A   3/2009
KR      20130014252 A    2/2013
(Continued)

OTHER PUBLICATIONS

Office Action for the U.S. Appl. No. 17/524,524 issued by the USPTO on Oct. 27, 2023.
(Continued)

*Primary Examiner* — Matthew T Martin
*Assistant Examiner* — Bartholomew A Hornsby
(74) *Attorney, Agent, or Firm* — IP & T GROUP LLP

(57) ABSTRACT

A battery module includes a plurality of pouch-type battery cells, each of the pouch-type battery cells including an electrode assembly, a pouch, and electrode leads, the pouch including at least one electrode accommodation portion and a sealing portion; and a bus bar assembly having at least one conductive bus bar, wherein the electrode accommodation portion includes a body portion having a width greater than a height thereof, and an extension portion extending in a height direction and protruding from a central portion of the body portion, wherein the electrode leads are extending in the height direction, wherein the bus bar is coupled to the electrode leads in a vertical direction of the pouch-type battery cell, and wherein the upper end of the bus bar in the height direction is lower than an upper end of an extension portion of the pouch.

19 Claims, 17 Drawing Sheets

(58) Field of Classification Search
CPC .......... H01M 10/6567; H01M 50/298; H01M 50/502; Y02E 60/10; Y02P 70/50
See application file for complete search history.

(56) References Cited

U.S. PATENT DOCUMENTS

| | | | |
|---|---|---|---|
| 2011/0200866 A1 | 8/2011 | Yun et al. | |
| 2012/0015226 A1* | 1/2012 | Kim | H01M 50/24 |
| | | | 429/94 |
| 2013/0093398 A1 | 4/2013 | Takabayashi et al. | |
| 2014/0050954 A1* | 2/2014 | Kim | H01M 50/566 |
| | | | 429/90 |
| 2015/0037664 A1* | 2/2015 | Kang | H01M 50/105 |
| | | | 429/179 |
| 2015/0180095 A1* | 6/2015 | Chen | H01M 50/129 |
| | | | 429/120 |
| 2016/0013455 A1* | 1/2016 | Shiu | H01M 50/178 |
| | | | 156/227 |
| 2018/0375077 A1* | 12/2018 | Shin | H01M 50/20 |
| 2019/0181505 A1* | 6/2019 | Otsuka | H01M 50/136 |
| 2019/0379032 A1* | 12/2019 | Park | H01M 50/595 |
| 2020/0243817 A1* | 7/2020 | Kwak | H01M 50/211 |
| 2020/0343604 A1 | 10/2020 | Lee et al. | |
| 2020/0388805 A1* | 12/2020 | Yoo | H01M 10/6567 |

FOREIGN PATENT DOCUMENTS

| | | |
|---|---|---|
| KR | 10-2015-0124124 A | 11/2015 |
| KR | 10-2017-0013809 A | 2/2017 |
| KR | 10-2018-0138027 A | 12/2018 |
| KR | 10-2020-0125184 A | 11/2020 |

OTHER PUBLICATIONS

Office Action for Korean Patent Application No. 10-2020-0152192 issued by the Korean Patent Office on Apr. 29, 2025.

* cited by examiner

I-I'

A-A'

B-B'

BATTERY MODULE AND BATTERY PACK HAVING THE SAME

CROSS-REFERENCE TO RELATED APPLICATION(S)

This application claims benefit of priority to Korean Patent Application No. 10-2020-0152191 filed on Nov. 13, 2020 and Korean Patent Application No. 10-2020-0152192 filed on Nov. 13, 2020 in the Korean Intellectual Property Office, the disclosures of which are incorporated herein by reference in their entirety.

BACKGROUND

1. Field

The present disclosure relates to a battery module having a cell stack in which a plurality of battery cells are stacked, and a battery pack in which the cell stack is directly installed or installed through the battery module.

2. Description of Related Art

Unlike primary batteries, secondary batteries may be charged and discharged, and thus may be applied to various fields such as digital cameras, mobile phones, notebook computers, hybrid vehicles, and electric vehicles. Examples of secondary batteries include a nickel-cadmium battery, a nickel-metal hydride battery, a nickel-hydrogen battery, and a lithium secondary battery.

Research into lithium secondary batteries having high energy density and discharge voltage, among the secondary batteries, have been conducted. Recently, lithium secondary batteries have been manufactured as pouch type battery cells having flexibility or square or cylindrical type battery cells having rigidity, and a plurality of battery cells may be electrically connected to be used. Here, the plurality of battery cells form a cell stack and may be disposed inside a module housing to form a battery module.

FIG. 1 is a perspective view illustrating an example of a battery module 10 having a prismatic battery cell 12 according to the related art, and FIG. 2 is a cross-sectional view taken along line I-I' in FIG.

As illustrated in FIG. 1, a battery module 10 according to the related art may have a structure in which a plurality of prismatic battery cells 12 are stacked in a module frame 11.

Referring to FIGS. 1 and 2, the battery module 10 in the related art may have a bus bar assembly 13 electrically connecting an insulator 14 to an electrode of the battery cell 12 on the prismatic battery cell 12. In this case, an empty space may be formed between the bus bar assemblies 13 protruding on both sides of the module housing 10 in the width direction (the horizontal direction in FIG. 2), respectively.

To increase space utilization, in the battery module 10 having the prismatic battery cell 12 in the related art, a support portion 15 may be disposed in the empty space between the bus bar assemblies 13, and a PCB 16 or a FPCB may be disposed as illustrated in FIG. 2. However, even in this case, a dead space DS may still be formed between the bus bar assembly 13 and the PCB 16 and between the bus bar assembly 13 and the side surfaces of the module housing 11, such that energy density (unit: Wh/kg or Wh/L) may be lowered. Also, the space between the bus bar assemblies 13 protruding upwardly from the battery cell 12 may only be used for installation of the PCB 16 or the FPCB. Accordingly, when the width (the width in the horizontal direction in FIG. 2) of the battery cell 12 is increased, the space remaining after the PCB 16 or the FPCB is installed may increase, such that the dead space DS may further increase. Accordingly, the battery module 10 having the prismatic battery cell 12 in the related art may not fully utilize the space occupied by the battery module 10, such that space utilization and energy density may be degraded.

FIG. 3 is an exploded perspective view illustrating an example of a battery module 20 having a pouch-type battery cell 30 in the related art. FIG. 4 is a perspective view illustrating the pouch-type battery cell 30 illustrated in FIG. 3. FIG. 5 is a schematic view illustrating the pouch-type battery cell 30 illustrated in FIG. 4.

Referring to FIG. 3, the battery module 20 according to the related art having the pouch-type battery cell 30 includes a plurality of pouch-type battery cells 30 stacked inside module housings 21 and 25. The module housings 21 and 25 include a lower plate 21 including a bottom portion 22 and a side wall portion 23 and having a shape with one side (e.g., upper side) opened and a cover plate 25 covering the opened side of the lower plate 21. The module housings 21 and 25 may have a tubular shape with two open ends, and the two open ends may be covered by an end plate 26. A bus bar assembly 30 may be provided between an end plate 26 and the stack of battery cells 10. The bus bar assembly 30 may include a bus bar (not shown), to which an electrode lead 35 is electrically connected, and a connection terminal 32 electrically connected to the bus bar and electrically connected externally. In addition, an opening 27 for exposing the connection terminal 32 externally may be formed in the end plate 26.

Referring to FIGS. 4 and 5, the pouch-type battery cell 30 of a related art may include an electrode assembly (not shown) including a positive electrode plate, a negative electrode plate, and a separator, and a pouch 31 (casing) surrounding the electrode assembly. The pouch 31 includes an electrode accommodation portion 32 forming a portion for accommodating the electrode assembly and sealing portions 13 (33a and 33b) formed by bonding peripheral portions of the pouch 31 along the periphery of the electrode assembly.

In addition, the pouch-type battery cell 30 includes the electrode lead 15 connected to an electrode plate (the positive electrode plate and the negative electrode plate) of the electrode assembly and outwardly protruding from the pouch 32 from two ends of the battery cell 30 in a width direction (a length direction) (a left-right direction in FIG. 5) and an insulating portion 35a for increasing sealing of the pouch 31 and securing an electrical insulating state in a position of the sealing portions 13a and 13b from which the electrode lead 35 is drawn out.

As illustrated in FIGS. 4 and 5, in the pouch-type battery cell 30 according to the related art, sealing portions 33a are formed at two ends (on both sides) in a width direction (in a length direction) and the electrode lead 35 extends outwardly from the sealing portion 33a. Accordingly, a width (length) L1 of a region A' in which the electrode plate (the positive electrode plate or the negative electrode plate) of the electrode assembly is located, corresponds to only a portion of a total width (length) L of the battery cell 30. That is, in the pouch-type battery cell 30 according to the related art, the width of an electrode plate does not include a width L3, which is the sum of the protruding length of the electrode lead 35 and the width L2 of the sealing portion 33a on both ends of the battery cell. In the case of pouch-type battery cell 30, the width (length) L3 in which the electrode plate is not formed in the one side portion from which the electrode lead 35 is exposed is about 20 mm. The electrode leads 35 connected to the positive and negative electrode plates, respectively, may be disposed on both sides of the battery cell 30. Accordingly, the electrode plate is not installed in a portion corresponding to the width (length) of about 40 mm with respect to the total width (length) L of the battery cell 30. In particular, in the pouch-type battery cell 30, the electrode plate is not installed by the certain width L3 at both ends of the battery cell 30, regardless of a height of the electrode lead 35 (e.g., regardless of a ratio of a height of the electrode lead to the overall height of the electrode assembly). Therefore, in the pouch-type battery cell 30 according to the related art, since the ratio of the portion of the total installation area of the battery cell in which the electrode plate is not installed is large, capacity loss may occur and energy density per unit volume of the battery cell cannot be sufficiently increased.

As such, in the battery modules 10 and 20 in the related art, space utilization and energy density may be lowered in terms of both the structure formed by stacking the prismatic battery cell 12 (FIGS. 1 and 2) or the structure formed by stacking the pouch-type battery cell 30 (FIGS. 3 to 5).

Furthermore, in recent years, in battery systems for electric vehicles, battery modules are located on a vehicle floor (i.e., below a seat). In this case, as a height of the battery module is lowered, space utilization increases. Therefore, demand for a battery cell having a lower height and a longer width (length) has increased.

In addition, in terms of implementing an increase in overall electrical capacity, the long-width pouch-type battery cell 30 has been developed for various purposes, such as for vehicles, and demand for speed charging has gradually increased.

For speed charging, resistance of the battery cell should be lowered. In the case of the pouch-type battery cell 30, in order to lower resistance, a vertical width (the height of the electrode lead in FIGS. 4 and 5) of the electrode lead 35 may be increased.

However, in the case of the pouch-type battery cell 30 according to the related art, since the electrode leads are exposed outwardly from both ends of the battery cell 30 in the width direction (length direction) (left-right direction in FIG. 5), the width of the electrode lead 35 is inevitably smaller than the height of the battery cell 30. Therefore, in order to increase the width of the electrode lead 35 for the purpose of reducing resistance of the battery cell, it is necessary to increase the height of the battery cell 30, which, however, runs counter to the recent tendency of reducing the overall height of the battery module 20 (especially, in the case of a vehicle battery module, there are many restrictions on the height of the battery module).

SUMMARY

Various embodiments of the present disclosure provide a battery module which may improve energy density per unit volume as compared to a battery module including general battery cells, particularly pouch-type battery cells, and a battery pack having the same.

Various embodiments of the present disclosure provide a battery module which may increase space utilization as compared to a battery module having general battery cells, particularly pouch-type battery cells, and a battery pack having the same.

Various embodiments of the present disclosure provide a battery module which may improve cooling and heat dissipation performance of a bus bar, and a battery pack having the same.

Various embodiments of the present disclosure provide a battery module which may reduce a height of a battery cell and may improve energy density and space utilization, and a battery pack having the same.

Various embodiments of the present disclosure provide a battery module advantageous for rapid charging, and a battery pack having same.

According to an aspect of the present disclosure, a battery module includes a plurality of pouch-type battery cells, each of the pouch-type battery cells including an electrode assembly, a pouch enclosing the electrode assembly, and electrode leads electrically connected to the electrode assembly, the pouch including at least one electrode accommodation portion accommodating the electrode assembly therein and a sealing portion sealing at least a portion of a periphery of the electrode accommodation portion; and a bus bar assembly having at least one conductive bus bar electrically connected to the electrode leads, wherein the electrode accommodation portion includes a body portion having a width greater than a height thereof, and an extension portion extending in a height direction and protruding from a central portion of the body portion taken in the width direction, and having a width less than the width of the body portion, wherein the electrode leads may be extending in the height direction out from the body portion, wherein the bus bar is coupled to the electrode leads in a vertical direction of the pouch-type battery cell, and wherein the upper end of the bus bar in the height direction is lower than an upper end of an extension portion of the pouch.

The sealing portion may include a first sealing portion formed on both side portions of the body portion of the electrode accommodation portion in the width direction and a second sealing portion formed on the electrode accommodation portion. In this case, the second sealing portion may be formed on both side portions of the extension portion in the width direction, an upper portion of the extension portion, and on upper portions of the body portion positioned on both sides of the extension portion in the width direction.

An upper end of the electrode leads may have a height lower than the outer height of the pouch-type battery cell.

The bus bar may include a conductive bus bar body having a coupling hole to which the electrode leads are coupled by penetrating through the coupling hole, and the bus bar assembly may further include a support plate disposed between the bus bar body and the electrode accommodation portion, supporting the bus bar, and penetrated by the electrode leads in the vertical direction.

The sealing portion may include a first sealing portion formed on both sides of the body portion of the electrode accommodation portion taken in the width direction, and a second sealing portion formed above the electrode accommodation portion. The second sealing portion may be formed on both side portions of the extension portion in the width direction, an upper portion of the extension portion, and on upper portions of the body portion positioned on both sides of the extension portion in the width direction. The first sealing portion may include a first bending portion bent at least once, and the second sealing portion may include a second bending portion bent at least once and disposed above the extension portion. The second sealing portion may haves a step shape between the portion formed above the body portion and the portion formed above the extension portion.

The electrode leads may be exposed externally through the second sealing portion formed above the body portion. The bus bar may have a height lower than an outer height of the second bending portion while being coupled to the electrode leads. An upper end of the electrode leads may have a height lower than the outer height of the second bending portion. At least one of the first bending portion and the second bent part may have a twice bent shape. At least one of the first bending portion and the second bending portion may have a twice bent shape.

A sensing module for sensing at least one of a voltage and a temperature of the pouch-type battery cell may be installed above the second bending portion. At least a portion of the sensing module may be disposed between the bus bar and the extension portion and may be disposed on a level lower than a level of the second bending portion. The electrode assembly may have a shape in which a plurality of positive and negative electrode plates are stacked with a separator interposed therebetween, wherein each of the positive electrode plates may include a positive electrode plate extension portion extending from a width-directional central portion of the positive electrode plate taken in one direction, and a positive electrode tab protruding in one direction from one width-directional edge of the positive electrode plate and connected to the electrode leads, and wherein each of the negative electrode plates may include a negative electrode plate extension portion extending from a width-directional central portion of the negative electrode plate in one direction, and a negative electrode tab protruding in one direction from the other width-directional edge of the negative electrode plate and connected to the electrode leads.

A width of the electrode accommodation portion may be twice or more than a height of the electrode accommodation portion. A width of the electrode leads may be equal to or greater than 20 mm, and may be equal to or less than ⅓ of the width of the electrode accommodation portion.

A plurality of the pouch-type battery cells may be stacked to form the cell stack, and the pouch-type battery cells may be attached to adjacent pouch-type battery cells by double-sided tape. The cell stack may include a buffer pad formed of an elastic material disposed between the pouch-type battery cells.

The battery module may further include a module housing having an internal space accommodating the pouch-type battery cell and having a pipe shape with two open ends in a length direction, wherein at least one end plate may be coupled to the two open ends of the module housing.

The battery module may further include a cooling member installed in the module housing for cooling the pouch-type battery cells and configured to allow a cooling liquid to flow. The bus bar assembly may be configured to be in thermally contact with a portion of the module housing in which the cooling member is installed such that cooling may be performed through the cooling member.

According to an aspect of the present disclosure, a battery pack includes the battery module described above; and a pack housing having an internal space for accommodating the plurality of battery modules.

The battery module may further include a module housing covering at least a portion of the plurality of pouch-type battery cells, and the battery module may be installed in the pack housing through the module housing.

BRIEF DESCRIPTION OF DRAWINGS

The above and other aspects, features, components of the present disclosure will be more clearly understood from the following detailed description, taken in conjunction with the accompanying drawings, in which.

DETAILED DESCRIPTION

Figure 1:
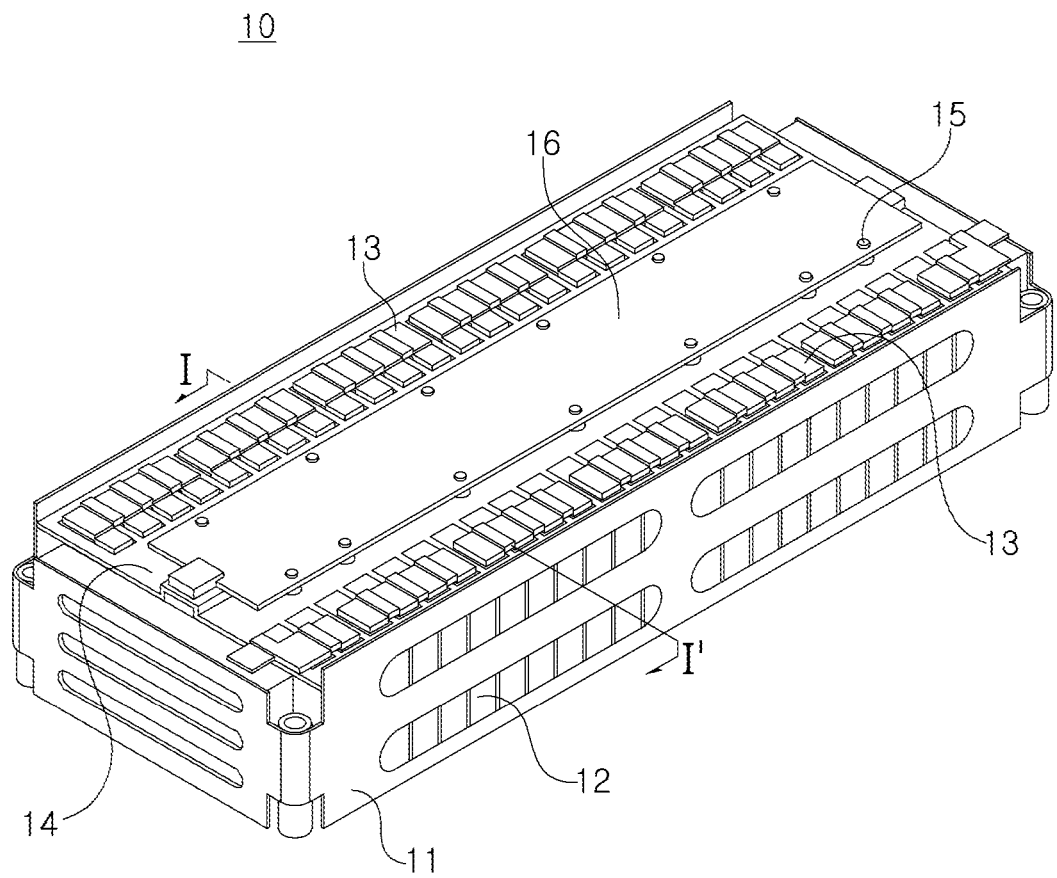
FIG. 1 is a perspective view illustrating a battery module including a prismatic battery cell according to the related art.
Figure 2:
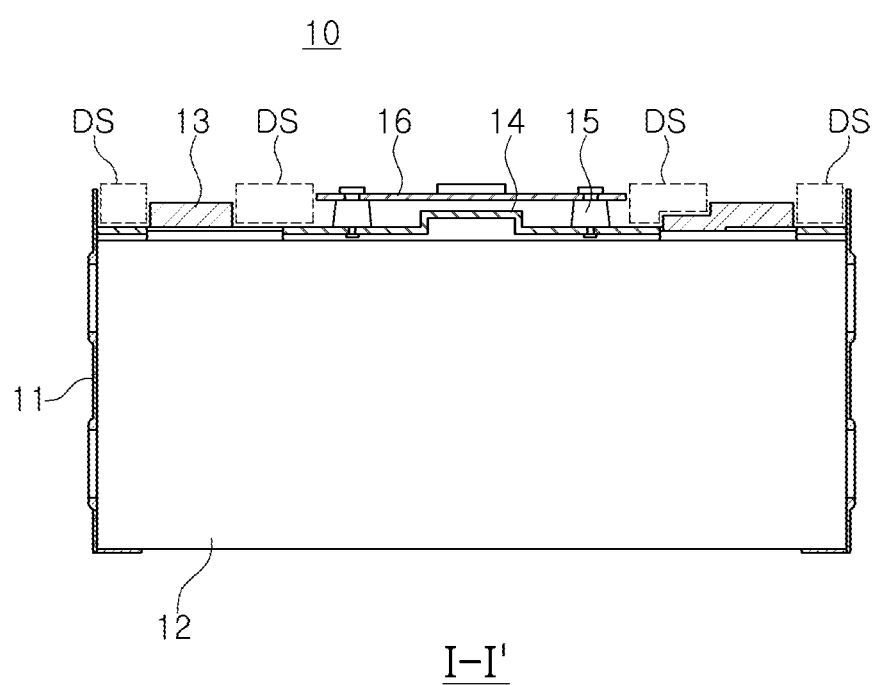
FIG. 2 is a cross-sectional view taken along line I-I' in FIG. 1.
Figure 3:
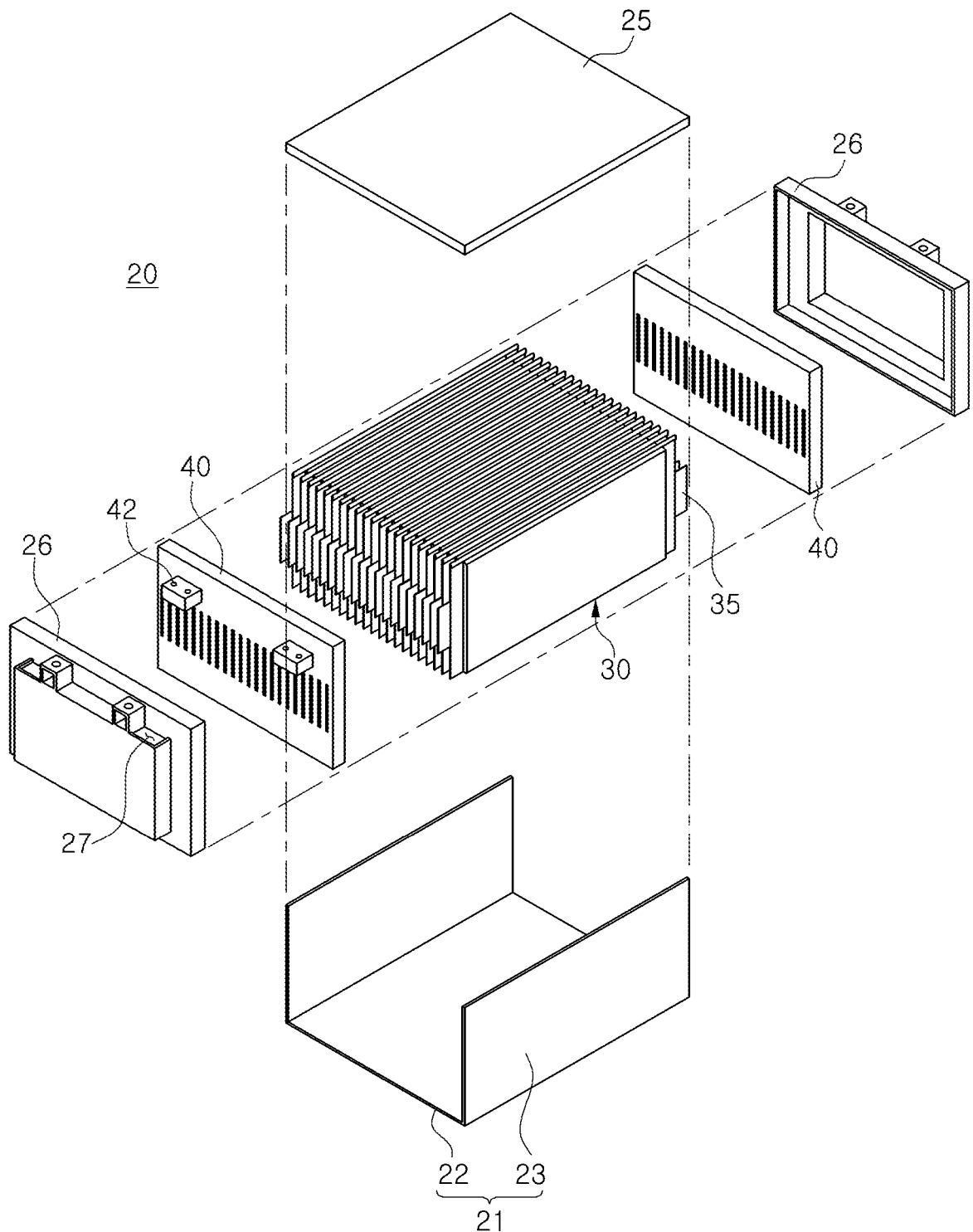
FIG. 3 is a perspective view illustrating a battery module including a pouch-type battery cell according to the related art.

Prior to the description of the present disclosure, terms and words used in the present disclosure and claims to be described below should not be construed as limited to ordinary or dictionary terms, and should be construed in accordance with the technical feature of the present disclosure based on the principle that the inventors can properly define their own inventions in their own terms that best explain the invention. Therefore, the embodiments described in the present disclosure and the configurations illustrated in the drawings are merely embodiments of the present disclosure and are not intended to represent all of the technical features of the present disclosure, and thus should be understood that various equivalents and modifications may be substituted at the time of the present application.

Hereinafter, embodiments of the present disclosure will be described in detail with reference to the accompanying drawings. In this case, in the drawings, the same components are denoted by the same reference numerals/symbols. Further, the detailed description of well-known functions and constructions which may obscure the gist of the present disclosure will be omitted. For the same reason, some of the elements in the accompanying drawings are exaggerated, omitted, or schematically illustrated, and the size of each element may not reflect the actual size.

First, a battery module 100 according to an embodiment of the present disclosure will be described with reference to FIGS. 6 to 13.

Figure 6:
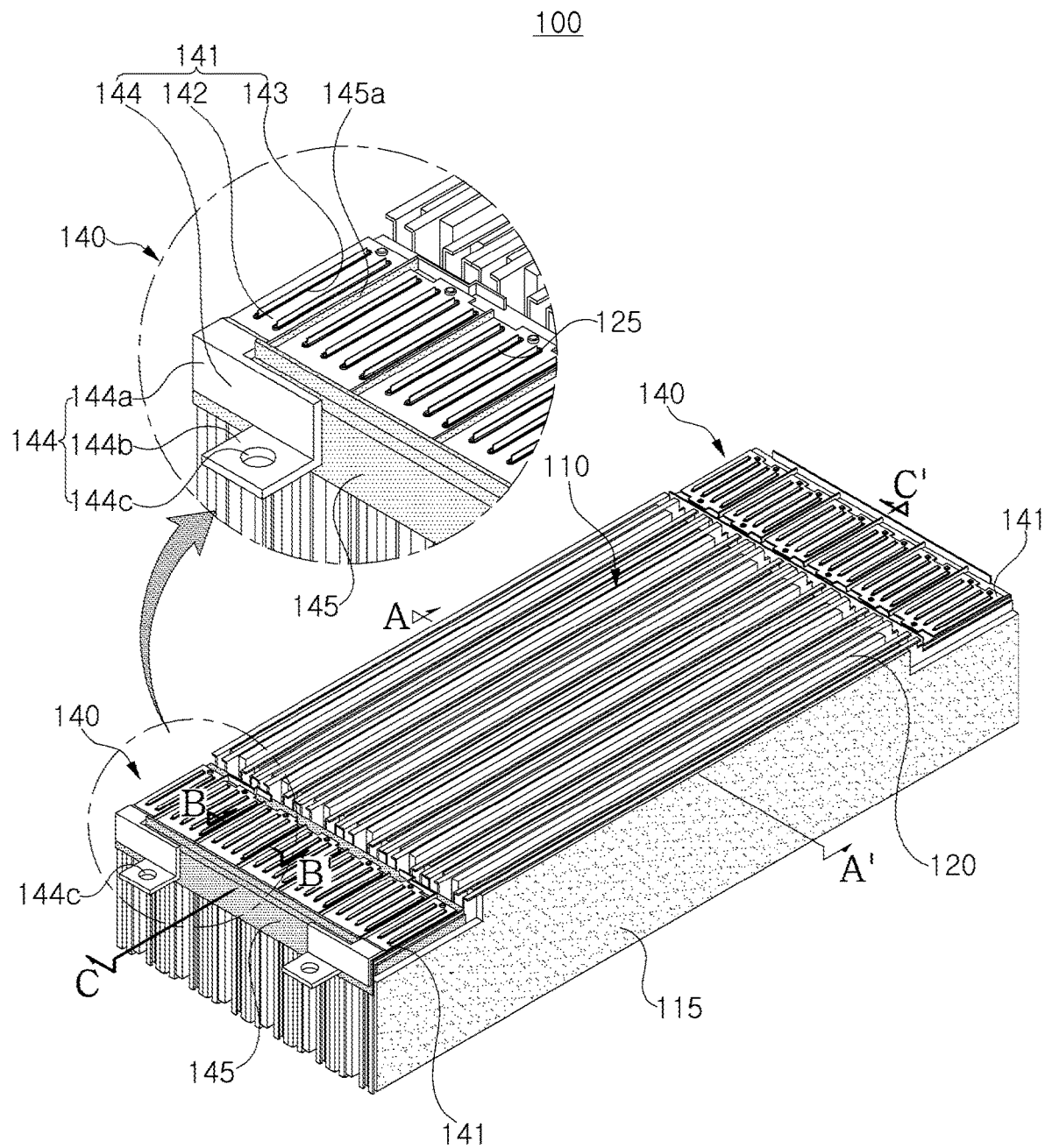
FIG. 6 is a perspective view illustrating a battery module, illustrating a state in which a module housing is not included, according to an embodiment of the present disclosure.
Figure 7:
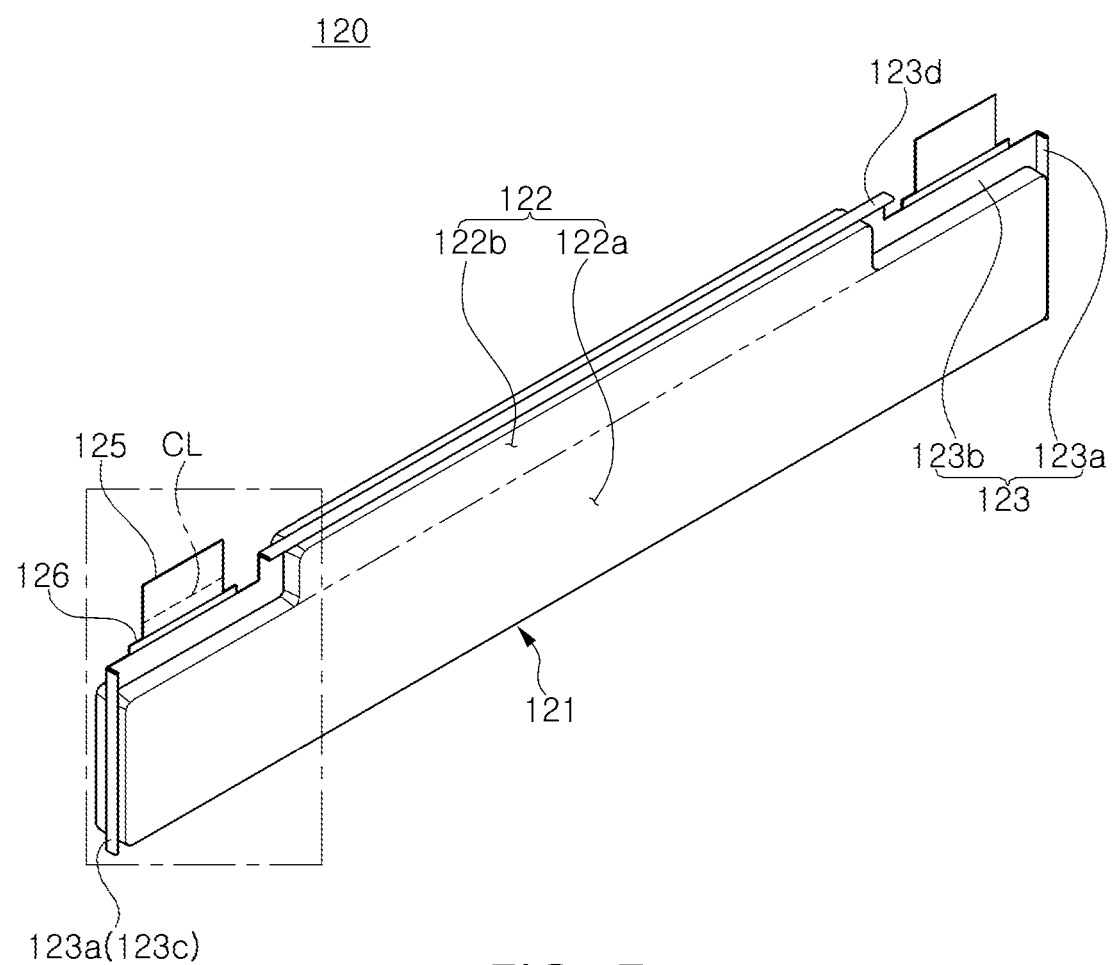
FIG. 7 is a perspective view illustrating a battery cell included in the battery module illustrated in FIG. 6.
Figure 8:
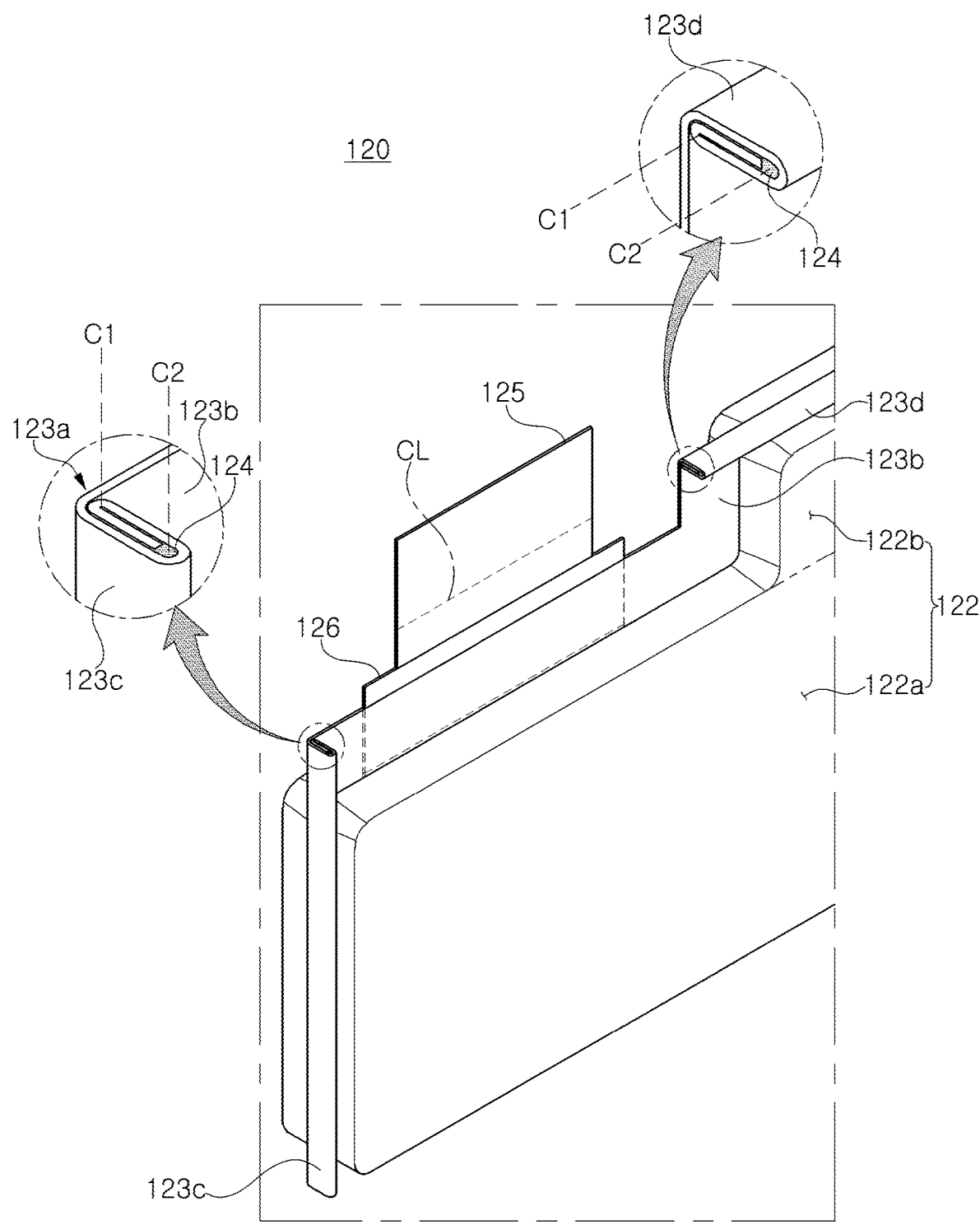
FIG. 8 is an enlarged view illustrating a quadrangular box in FIG. 7.
Figure 9:
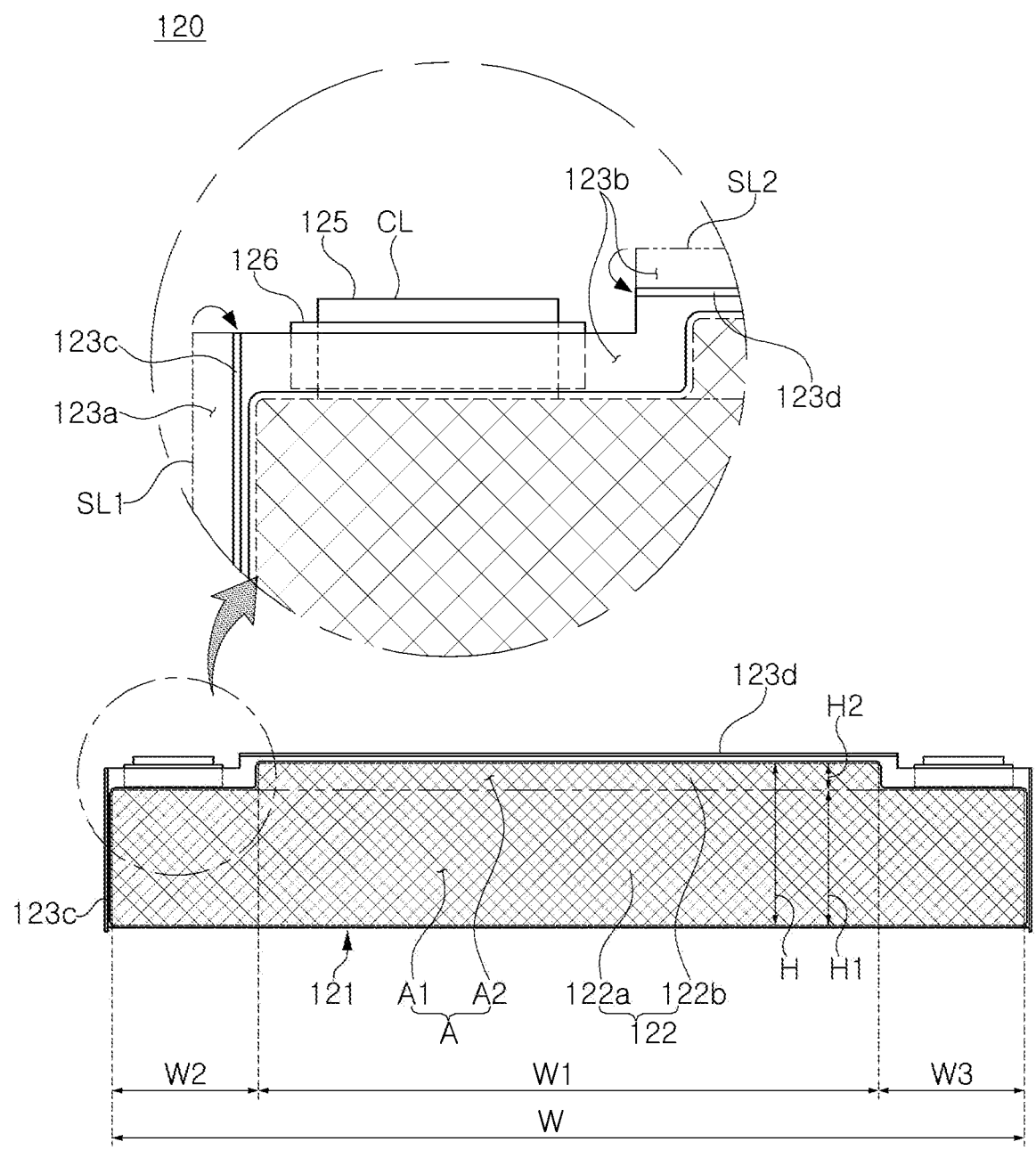
FIG. 9 is a view illustrating a side surface (a wider surface) of the battery cell illustrated in FIG. 7.
Figure 10:
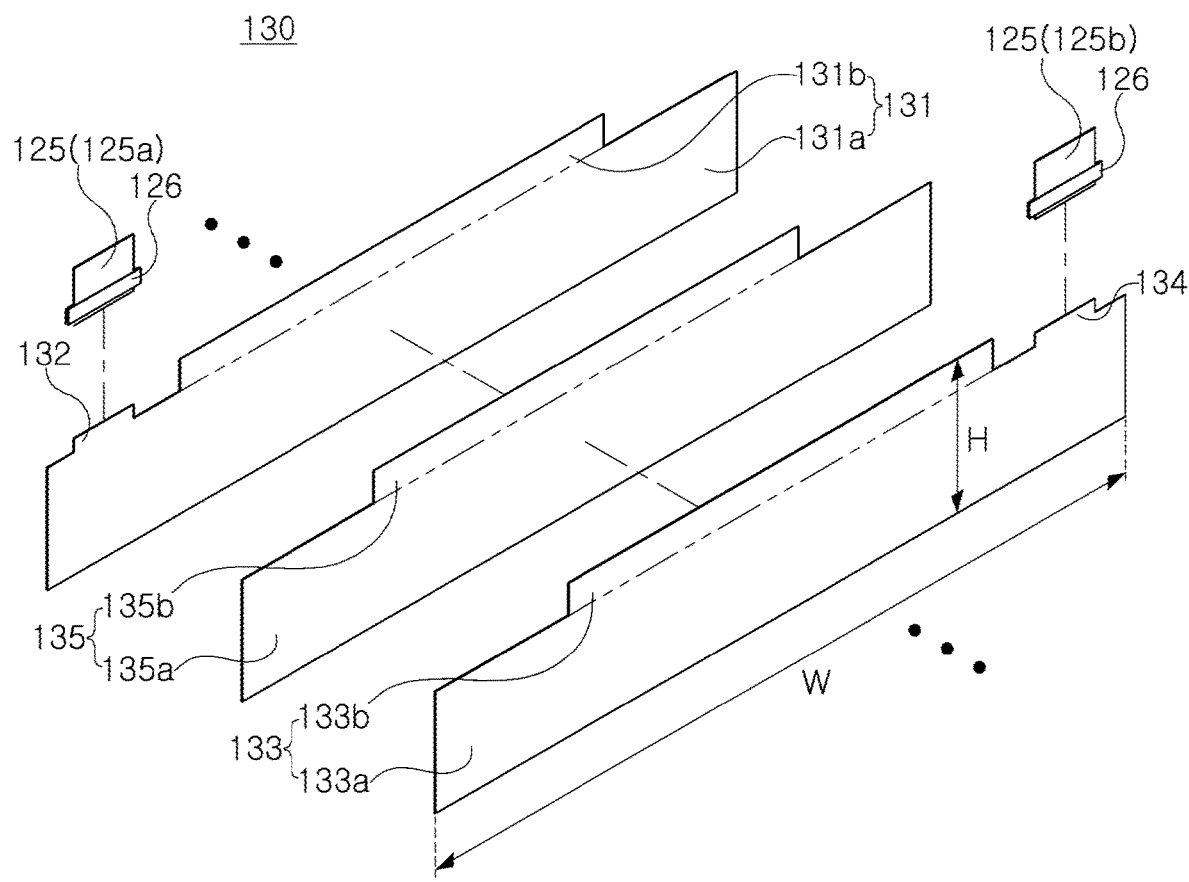
FIG. 10 is an exploded perspective view illustrating an electrode assembly and electrode leads installed in the pouch (a casing) illustrated in FIG. 7.
Figure 11:
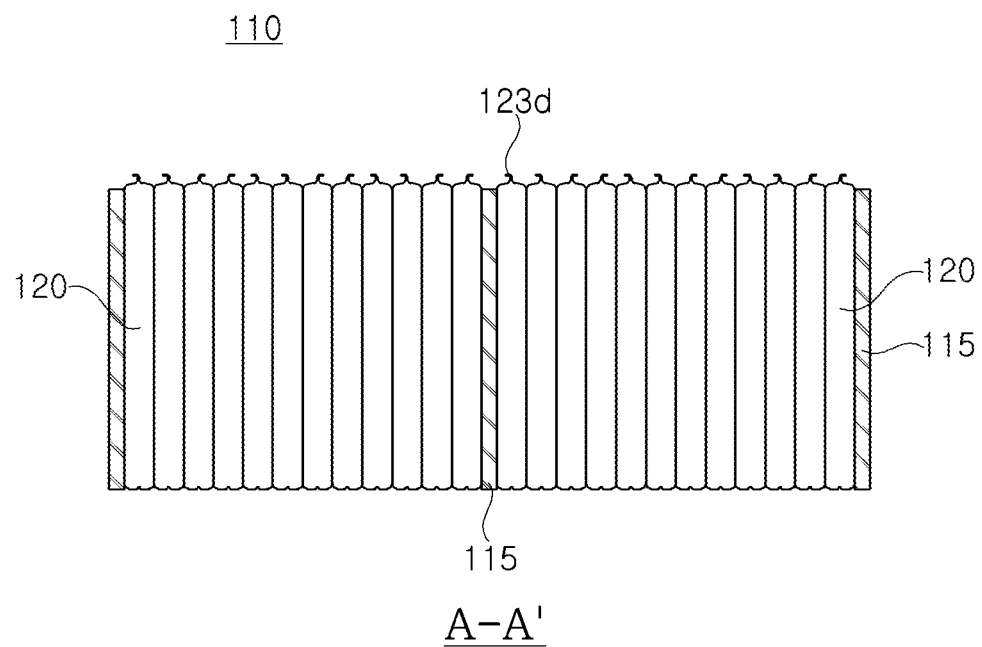
FIG. 11 is a cross-sectional view taken along line A-A' in FIG. 6.
Figure 12:
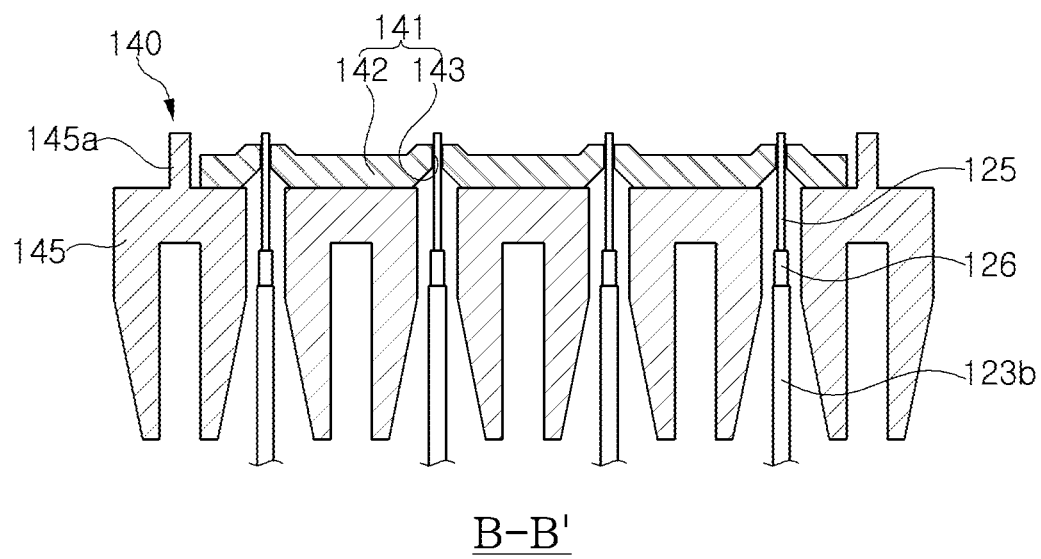
FIG. 12 is a cross-sectional view taken along line B-B' in FIG. 6.
Figure 13:
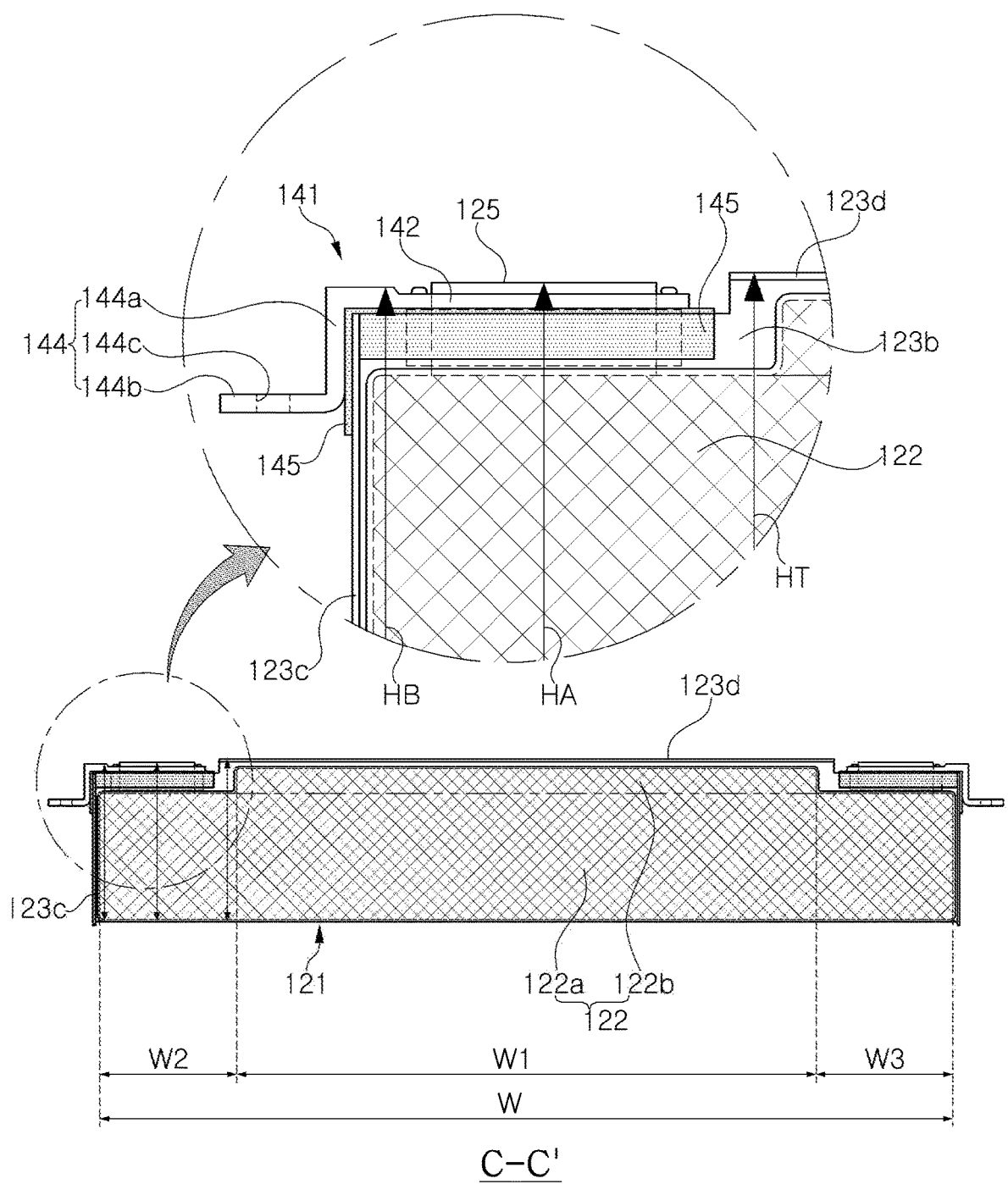
FIG. 13 is a cross-sectional view taken along line C-C' in FIG. 6.

FIG. 6 is a perspective view illustrating a battery module 100, illustrating a state in which a module housing 170 is not illustrated, according to an embodiment. FIG. 7 is a perspective view illustrating a battery cell 120 included in the battery module 100 illustrated in FIG. 6. FIG. 8 is an enlarged view illustrating a quadrangular box portion in FIG. 7. FIG. 9 is a view illustrating a side surface (a wider surface) of the battery cell 120 illustrated in FIG. 7. FIG. 10 is an exploded perspective view illustrating an electrode assembly 130 and an electrode lead 125 installed in the pouch (a casing) 121 illustrated in FIG. 7. FIG. 11 is a cross-sectional view taken along line A-A' in FIG. 6. FIG. 12 is a cross-sectional view taken along line B-B' in FIG. 6. FIG. 13 is a cross-sectional view taken along line C-C' in FIG. 6.

Referring to FIGS. 6 to 13, the battery module 100 in the embodiment may include a plurality of pouch-type battery cells 120 and a bus bar assembly 140.

In the embodiment, the battery module 100 may include a plurality of battery cells 120 and a bus bar assembly 140 connected thereto. That is, in the embodiment, the battery module 100 may not necessarily include the module housing 170 illustrated in FIGS. 16 to 19, and at least a portion of the module housing 170 (e.g., a cover portion 175) may be mounted on the battery pack 200 without being coupled thereto.

As illustrated in FIG. 6, the plurality of pouch-type battery cells 120 may be stacked to form a cell stack 122, and the battery cells 120 may be attached to an adjacent battery cell 120 by double-sided tape (not illustrated) to stack the battery cells 120. The double-sided tape may be attached to a side surface (a wider surface) of the battery cell 120 and may fasten the plurality of battery cells 120 to each other.

Referring to FIGS. 7 to 10, each battery cell 120 is configured as a pouch type secondary battery, and may have a form in which the electrode assembly 130 (in FIG. 10) and an electrolyte are accommodated in the pouch (casing) 121. As an example, in an embodiment of the present disclosure, the battery cell 120 may include a lithium ion (Li-ion) battery or a nickel metal hydride (Ni-MH) battery which is chargeable or dischargeable. Also, the battery cell 120 may have a structure in which the electrode lead 125 electrically connected to the electrode assembly 130 protrudes externally of the pouch 121.

Referring to FIGS. 7 and 8, the pouch 121 may be divided into an electrode accommodation portion 122 and a sealing portion 123, and may be formed of a pouch film casing portion formed of a material such as aluminum. The electrode accommodation portion 122 is formed in a container shape to provide a rectangular internal space. An electrode assembly 130 and an electrolyte are accommodated in the internal space of the electrode accommodation portion 122. The electrode accommodation portion 122 has a shape corresponding to the electrode assembly 130 and has a shape slightly larger than that of the electrode assembly 130 to accommodate the electrode assembly 130.

As illustrated in FIGS. 7 to 9, the electrode accommodation portion 122 has a shape corresponding to the electrode assembly 130 to accommodate the electrode assembly 130. That is, the electrode accommodation portion 122 may include a body portion 122a having a greater width than height. The electrode accommodation portion 122 may also include an extension portion 122b extending and protruding from a center portion of the body portion 122a in the width direction to one side (e.g., in the vertical direction) and having a width narrower than the body portion 122a. The extension portion 122b also has a height smaller than the height of the body portion 122a. Accordingly, in the present embodiment, the electrode accommodation portion 122 may have a cuboid shape in which a first cuboid constituting the body portion 122a and a second cuboid forming the extension portion 122b are combined. When viewed from the side, the accommodation portion 122 may have a shape in which a quadrangle constituting one of the six faces of the body portion 122a and a quadrangle constituting one of the six faces of the extension portion 122b having a width narrower than that of the body portion 122a are combined. That is, from a side view, the electrode accommodation portion 122 may generally have a two-dimensional shape of a '凸 (protrusion)' which is referred to herein as a quadrangle protrusion shape having eight sides. In addition, in order to form the battery cell 120 having the width greater than the height thereof, the width (W in FIG. 9) of the electrode accommodation portion 122 (i.e., the width W of the body portion 122a) may be twice or more than the height (H in FIG. 9, which is the height of the body portion 122a plus the height of the extension portion 122b) of the electrode accommodation portion 122.

The sealing portion 123 may be a portion to which at least a portion of the pouch 121 is bonded to seal the periphery of the electrode accommodation portion 122. The sealing portion 123 is formed in at least a portion of the periphery of the electrode accommodation portion 122 to seal the electrode assembly 122. Accordingly, the sealing portion 123 is formed in the form of a flange extending outward from the electrode accommodation portion 122 formed in the container shape and is disposed along at least a portion of an outer portion of the electrode accommodation portion 122. A heat-sealing method may be used to bond the pouch 121 to form the sealing portion 123, but is not limited thereto. In an embodiment of the present disclosure, the sealing portion 123 may include a first sealing portion 121 formed on both sides of the electrode accommodation portion 122 in the width direction and a second sealing portion 125 formed at an upper portion of the electrode accommodation portion 122.

In the embodiment, the pouch 121 may be formed by forming a casing sheet. More specifically, after forming one or two accommodating portions in a single casing sheet, the casing may be folded to form a space (electrode accommodation portion 122), thereby completing the pouch 121. Also, the sealing portion 123 formed by bonding a casing may be provided on the external side of the electrode accommodation portion 122. However, as described above, it may not be necessary to form the sealing portion 123 on the surface on which the casing is folded. Therefore, in the embodiment, the sealing portion 123 may be formed on the periphery of the electrode accommodation portion 122, and may be provided only on three surfaces among the upper, lower, left and right surfaces of the electrode accommodation portion 122, and the sealing portion 123 may not be disposed on the bottom side (the lower side in FIGS. 7 to 9) of the periphery of the electrode accommodation portion 122.

Also, in the embodiment, the sealing portion 123 may include a first sealing portion 123a formed on both sides of the electrode accommodation portion 122 taken in the width direction, and a second sealing portion 123b formed above the electrode accommodation portion 122.

The second sealing portion 123b may be formed on both sides of the extension portion 122b of the electrode accommodation portion 122 taken in the width direction and above the extension portion 122b, and above a portion of the body portion 122a disposed on both sides of the extension portion 122b taken in the width direction.

Also, the electrode lead 125 may be exposed externally through the second sealing portion 123b disposed on both sides of the extension portion 122b taken in the width direction of the body portion 122a. In this case, the electrode lead 125 may be covered by the insulating portion 126 to increase the sealing degree of the second sealing portion 123b in the position in which the electrode lead 125 is drawn out and to secure an electrical insulation state.

Also, in the battery cell 120 in the embodiment, to increase bonding reliability of the sealing portion 123 and to reduce the area of the sealing portion 123, the sealing portion 123 may be bent (folded) at least once.

More specifically, in the pouch 121, the bending portions 123c and 123d may be formed by bending an area of the sealing portion 123 in which the electrode lead 125 is not disposed.

Referring to FIGS. 7 to 9, the first sealing portion 123a may include a first bending portion 123c bent at least once, and the second sealing portion 123b may include a second bending portion 123d bent at least once above the extension portion 122b to which the electrode lead 125 is not exposed.

To reliably seal the sealing portion 123 and to reduce the area of the sealing portion 123, at least one of the first bending portion 123c and the second bending portion 123d may be configured to be bent twice.

Referring to FIG. 9, the first sealing portion 123a may have a shape extending from the electrode accommodation portion 122 to an end line SL1 of the first sealing portion before being bent.

Referring to FIG. 8, the first sealing portion 123a may be folded by 180° along a first bending line C1 and may be folded again along a second bending line C2, thereby forming the first bending portion 123c. In this case, an adhesive member 124 may be filled in the first sealing portion 123a, and the first sealing portion 123a may maintain the shape of the first bending portion 123c by the adhesive member 124. The adhesive member 124 may be formed of an adhesive having high thermal conductivity. For example, the adhesive member 124 may be formed of epoxy or silicone, but an embodiment thereof is not limited thereto. As described above, by forming the first bending portion 123c in the first sealing portion 123a, the volume occupied by the first sealing portion 123a in the battery cell 120 may be reduced.

The second sealing portion 123b may have a shape extending from the electrode accommodation portion 122 to the end line SL2 of the second sealing portion before being bent. Referring to FIG. 8, the second sealing portion 123b may be folded by 180° along the first bending line C1 and may be folded again along the second bending line C2, thereby forming the second bending portion 123d. In this case, an adhesive member 124 may be filled in the second sealing portion 123b, and the second sealing portion 123b may maintain the shape of the second bending portion 123d by the adhesive member. As described above, by forming the second bending portion 123d on the second sealing portion 123b, the volume occupied by the second sealing portion 123b in the battery cell 120 may be reduced.

Also, to form the second bending portion 123d above the extension portion 122b to which the electrode lead 125 is not exposed, a step shape may be formed between a portion (the left portion in the enlarged view in FIG. 9) formed above the body portion 122a and a portion (the right portion in the enlarged view in FIG. 9) formed above the extension portion 122b. That is, since the portion of the second sealing portion 123b formed above the extended portion 122b may be disposed on a level higher than a level of the portion of the second sealing portion 123b portion formed above the body 122a, both ends of the second sealing portion 123b formed above the extension portion 122b may be open to not be in contact with the other components, and accordingly, the second bending portion 123d may be easily formed.

The pouch 121 used in the embodiment may not be limited to the structure in which the sealing portion 123 is formed on three surfaces among the upper, lower, left, and right surfaces by folding a casing sheet as illustrated in FIGS. 7 to 9. For example, the electrode accommodation portion 122 may be formed by overlapping two casing sheets, and the sealing portion 123 may be formed on the upper, lower, left and right surfaces around the electrode accommodation portion 122.

Referring to FIG. 10, the electrode assembly 130 includes a plurality of electrode plates 131 and 133 and a separator 135 and is accommodated in the electrode accommodation portion 122 of the pouch 121. The electrode plates 131 and 133 may have sizes and shapes corresponding to those of the electrode accommodation portion 122, and since the electrode plates 131 and 133 are accommodated in the electrode accommodation portion 122, the size of the electrode accommodation portion 122 may be slightly larger than the electrode plates 131 and 133.

The electrode plates 131 and 133 include a sheet-shaped positive electrode plate 131 and a sheet-shaped negative electrode plate 133, and the electrode assembly 130 may be formed by stacking the positive electrode plate 131 and the negative electrode plate 133 such that wide surfaces thereof face each other, with the sheet-shaped separator 135 interposed therebetween. That is, the electrode assembly 130 includes a plurality of positive electrode plates 131, negative electrode plates 133, and separators 135, and has a structure in which the sheet-shaped positive electrode plate 131, the separator 135, the negative electrode plate 133, and the separator 135 are stacked in order. The positive electrode plate 131 and the negative electrode plate 133 may be formed as a structure in which an active material slurry is applied to a current collector, and the slurry is typically formed by stirring a granular active material, an auxiliary conductor, a binder, a plasticizer, etc. in a state in which a solvent is added thereto.

The positive electrode plate 131 may include a positive electrode plate body portion 131a having a width greater than a height and positive electrode plate extension portion 131b extending from a width-directional central portion of the positive electrode plate body portion 131a in one direction (e.g., an up-down direction) and having a width narrower than that of the positive electrode plate body portion 131a. Also, the positive electrode plate 131 may include a positive electrode tab 132 protruding in one direction (e.g., upwardly) of the positive electrode plate body portion 131a from one width-directional edge (e.g., left side) of the positive electrode plate body portion 131a and connected to the electrode lead 125 on one side.

Similar to the positive electrode plate 131, the negative electrode plate 133 may include a negative electrode plate body portion 133a having a width greater than a height and a negative electrode plate extension portion 133b extending from a width-directional central portion of the negative electrode plate body portion 133a in one direction (e.g., the up-down direction) and having a width narrower than the negative electrode plate body portion 133a. Also, the negative electrode plate 133 may include a negative electrode tab 134 protruding in one direction (e.g., upwardly) of the negative electrode plate body portion 133a from the other width-directional edge (e.g., right side) of the negative electrode plate body portion 133a and connected to the electrode lead 125 on the other side.

That is, the positive electrode tab 132 and the negative electrode tab 134 may each have a shape protruding upwardly from both sides of the electrode assembly 130 in the width direction and may be connected to the electrode leads 125, that is, the positive electrode lead 125a and the negative electrode lead 125b, corresponding to the positive electrode and the negative electrode, respectively.

The positive electrode plate 131 in which the positive electrode plate extension portion 131b and the positive electrode tab 132 are formed and the negative electrode plate 133 in which the negative electrode plate extension portion 133b and the negative electrode tab 134 are formed may be formed by preparing sheet-shaped electrode plate materials and performing a notching operation on the periphery of the electrode plate materials to correspond to the shapes of the positive electrode plate 131 and the negative electrode plate 133, respectively.

The separator 135 has a slightly larger size than that of the positive electrode plate 131 and the negative electrode plate 133 in order to electrically separate the positive electrode plate 131 and the negative electrode plate 133.

Also, the electrode lead 125 may include a positive electrode lead 125a and a negative electrode lead 125b respectively connected to the positive electrode plate and the negative electrode plate of the electrode assembly 130. The positive electrode lead 125a may be connected to a plurality of positive electrode tabs 132 having a shape extending upwardly from one side of the positive electrode plate 131 in the width direction, and the negative electrode lead 125b may be connected to a plurality of negative electrode tabs 134 having a shape extending upwardly from the other side of the negative electrode plate 133 in the width direction. That is, the electrode lead 125 may have a shape extending from both sides of the body portion 122a of the electrode accommodation portion 122 taken in the width direction to one side (e.g., the vertical direction). Also, the electrode lead 125 may be connected to the electrode assembly 130 on the external side of the extension portion 122b of the electrode accommodation portion 122 taken in the width direction. Meanwhile, the electrode lead 125 may be cut along a cutting line CL after the sealing portion 123 is formed, so as not to be exposed externally of the pouch 121 more than necessary. In this case, a height (HA in FIG. 13) of the electrode lead 125 with respect to the cutting line CL may be lower than a height (HC in FIG. 13) of an outer portion of the battery cell 120.

The plurality of battery cells 120 may be stacked to form a cell stack 110, and to maintain the shape of the cell stack 110, adjacent battery cells 120 may be attached to each other by a double-sided tape.

Referring to FIGS. 6 and 11, at least one buffer pad 115 may be disposed in the cell stack 110. The buffer pad 115 may be disposed between the battery cell 120 and a sidewall of the module housing 170, and may also be disposed between the battery cells 120. The buffer pad 115 may be compressed and elastically deformed when a specific battery cell 120 expands due to a swelling phenomenon, thereby suppressing expansion of the entire volume of the cell stack 110. To this end, the buffer pad 115 may be formed of a polyurethane material, but the material is not limited thereto.

Referring to FIGS. 6, 12, and 13, the bus bar assembly 140 may include at least one conductive bus bar 141 electrically connected to the electrode lead 125 of the battery cell 120 and a support plate 145 electrically insulated.

The bus bar 141 may include a conductive bus bar body 142 in which a coupling hole 143 penetrated by the electrode lead 125 in the vertical direction and coupled to the electrode lead 125.

The electrode lead 125 of the battery cell 120 may be configured to extend vertically from both sides of the body portion 122a of the electrode accommodation portion 122 taken in the width direction and to be connected to the electrode plates 131 and 133. Accordingly, the bus bar 141 electrically connected to the electrode leads 125 may move in the vertical direction of the battery cell 120 on an external side of the extension portion 122b of the electrode accommodation portion 122 taken in width direction and may be coupled to the electrode leads 125. Each electrode lead 125 may be coupled to the bus bar 141 by welding while the electrode lead 125 penetrates the coupling hole 143 of the bus bar body 142, that is, the electrode lead 125 protrudes to the external side of the bus bar body 142.

While the electrode lead 125 is coupled to the bus bar 141, the upper portion of the electrode lead 125 protruding excessively to the external side of the bus bar 141 may be cut out in a subsequent process. For example, the upper portion of the electrode lead 125 may be cut out with respect to the cutting line CL (in FIGS. 7 to 9) after the battery cell 120 is coupled to the bus bar assembly 140. Accordingly, the end of the electrode lead 125 may have a height lower than that of the outer height of the second bending portion 123d.

Referring to FIGS. 6, 12 and 13, the support plate 145 may be disposed between the bus bar body 142 and the electrode accommodation portion 122 and may support the bus bar 141, and the electrode lead 125 may penetrate thereto in the vertical direction. That is, the electrode lead 125 may penetrate the support plate 145 in the vertical direction, and may be exposed to an upper side of the bus bar 141 through the coupling hole 143 formed in the bus bar 141. In this case, the end of the electrode lead 125 may be coupled to the bus bar 141 while not being bent, that is, while having a linear shape, as illustrated in FIG. 12. Accordingly, the process of bending the electrode lead 125 may not be performed, and the electrode lead 125 may be easily coupled to the bus bar 141. A partition protrusion 145a for supporting the side surfaces of the bus bars 141 may be formed on the support plate 145.

Also, the bus bar 141 may include a connection terminal portion 144 for electrical connection with an external entity, and a connection mechanism such as a plug (not illustrated) may be connected to the connection hole 144c and connection to an external entity may be enabled. In this case, the connection hole 144c may have a hole shape penetrating in the vertical direction such that an external connection mechanism may be connected thereto. Also, the connection terminal portion 144 may be connected to the bus bar body 142 to form the connection hole 144c penetrating in the vertical direction. The connection terminal portion 144 may include a first body 144a having a shape bent downwardly with respect to the bus bar body 142, and a second body 144b bent from the first body 144a and extending in a direction parallel to the bus bar body 142. The connection hole 144c may be provided in the second body 144b. The connection hole 144c may be exposed externally through the opening 176a of the end plate 176 and may be connected to an external connection mechanism.

Referring to FIG. 13, the height HB of the bus bar 141 may be less than the outer height HT of the battery cell 120 while the bus bar 141 is coupled to the electrode lead 125. In this case, since the portion in which the maximum height of the battery cell 120 may be the second bending portion 123d, the height HB of the bus bar 141 may be less than the outer height HT of the second bending portion 123d while the bus bar 141 is coupled to the electrode lead 125.

Also, the electrode lead 125 may be exposed to an external side (upper side) of the bus bar 141 while the bus bar 141 is coupled to the electrode lead 125. The height HA of the end of the electrode lead 125 may be less than the outer height HT of the battery cell 120. In this case, in the embodiment, the height HA of the end of the electrode lead 125 may refer to a height after the electrode lead 125 is cut out with reference to the cutting line CL (in FIGS. 7 to 9) after (or before) the battery cell 120 is coupled to the bus bar assembly 140. Also, the height HA of the end of the electrode lead 125 may be less than the height HT of the outer edge of the second bending portion 123d while the bus bar 141 is coupled to the electrode lead 125.

As described above, the positive electrode plate 131 includes a positive electrode plate body portion 131a and a positive electrode plate extension portion 131b, and the negative electrode plate 133 includes a negative electrode plate body portion 133a and a negative electrode plate extension portion 133b. In addition, the positive electrode plate 131 and the negative electrode plate 133 have sizes and shapes corresponding to each other.

Referring to FIG. 9, an overall height H of the electrode plates 131 and 133 including the positive electrode plate 131 and the negative electrode plate 133 corresponds to the sum of a height H1 of the electrode plate body portions 131a and 133a and a height H2 of the electrode plate extension portions 131b and 133b. Also, an overall width W of the electrode plates 131 and 133 corresponds to the sum of a width W1 of the electrode plate extension portions 131b and 133b and widths W2 and W3 of the portions of the electrode plate body portions 131a and 133a extending to both sides of the electrode plate extension portions 131b and 133b. Also, an overall area A of the electrode plates 131 and 133 corresponds to the sum of an area A1 of the electrode body portions 131a and 133a and an area A2 of the electrode plate extension portions 131b and 133b.

That is, in the battery cell 120 according to an embodiment of the present disclosure, since the electrode plate extension portions 131b and 133b extend in a space between the electrode leads 125, the area of the electrode plates 131 and 133 may be increased by the area A2 of the electrode plate extension portions 131b and 133b. Accordingly, energy density of the battery cell 120 per unit volume may be increased.

In addition, since the electrode accommodation portion 122 is formed to correspond to the size and shape of the electrode plates 131 and 133, a height, width, and area of the electrode accommodation portion 122 correspond to a height, width, and area of the electrode plates 131 and 133.

In this case, the width W of the electrode plates 131 and 133 may have a size twice or more than the height H of the electrode plates 131 and 133, and the width of the electrode accommodation portion 122 having the shape and size corresponding to the electrode plates 131 and 133 may be twice or more than the height of the electrode accommodation portion 122. Similarly, while the bending portions 123c and 123d are formed, the width of the battery cell 120 may be twice or more than the height of the battery cell 120.

Figure 4:
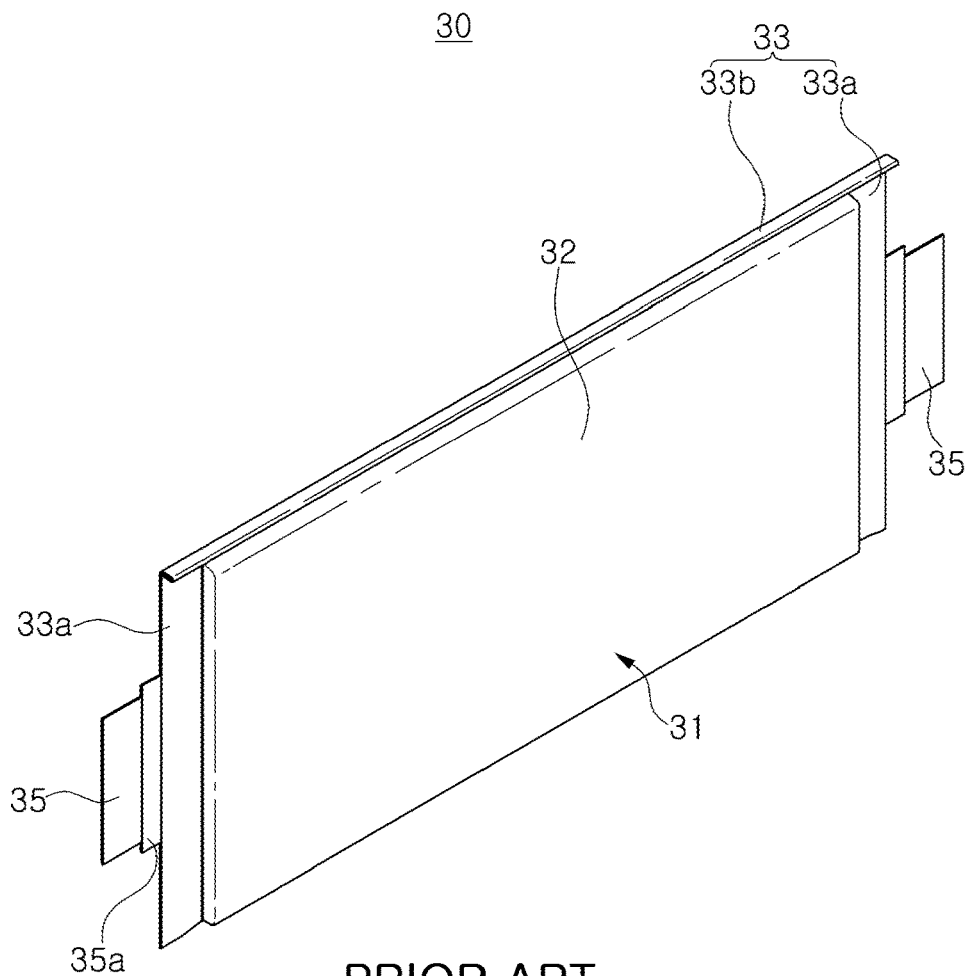
FIG. 4 is a perspective view illustrating the pouch-type battery cell illustrated in FIG. 3.
Figure 5:
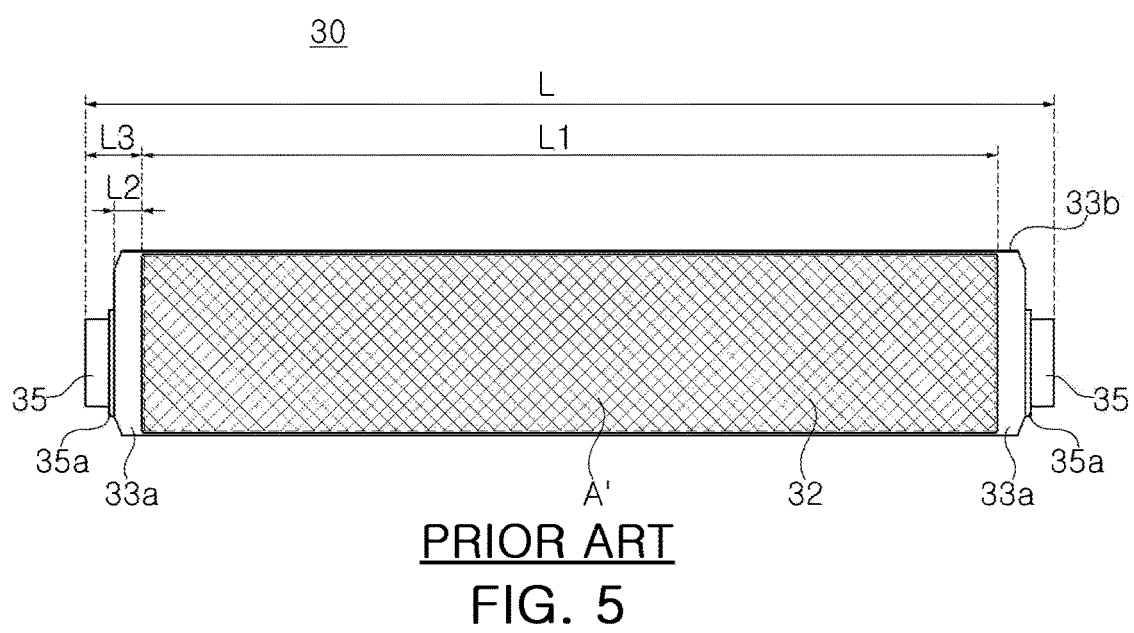
FIG. 5 is a view illustrating the pouch-type battery cell illustrated in FIG. 4.

In addition, according to an embodiment of the present disclosure, since the width W of the electrode plates 131 and 133 is twice or more of the height H of the electrode plates 131 and 133, it is possible to increase the width WL of the electrode lead 125. That is, since the electrode leads 125 have a shape extending upwardly from both sides of the electrode plates 131 and 133, respectively, and the electrode plate extension portions 131b and 133b are positioned between the both electrode leads 125, the width (the width of the electrode lead 125 in the horizontal direction in FIG. 9) of the electrode lead 125 may extend to ⅓ of the width W of the electrode plates 131 and 133. Accordingly, the width of the electrode lead 125 may be sufficiently wide compared to the related art pouch-type battery cell 30 (see FIGS. 4 and 5) having a structure in which the electrode leads 35 are exposed from both sides of the pouch 31. In this case, a minimum width of the electrode lead 125 is typically limited to 20 mm. That is, in an embodiment of the present disclosure, the width of the electrode lead 125 may be 20 mm or more, and equal to or less than ⅓ of the width (similar to the width W of the electrode plates 131 and 133) of the electrode accommodation portion 122.

In addition, the electrode lead 125 may have a thickness of 0.15 mm to 1 mm. In general, thicknesses of 0.3 mm for electrode leads formed of copper (Cu) (e.g., negative electrode leads) and 0.4 mm for electrode leads (formed of aluminum (Al) (e.g., positive electrode leads) are widely used. A sectional area of the electrode lead may be increased by adjusting the thickness of the electrode lead 125 according to the width WT of the electrode lead 125.

Therefore, according to an embodiment of the present disclosure, both the width and thickness of the electrode lead 125 may be increased, or the width of the electrode lead 125 may be increased while the thickness of the electrode lead 125 is fixed. Therefore, it is possible to increase the sectional area (width×thickness) of the electrode lead 125, thereby reducing resistance occurring in the electrode lead 125. Accordingly, the battery cell 120 according to an embodiment of the present disclosure may reduce electrical resistance, which is suitable for rapid charging.

As such, in the embodiment, by stacking the plurality of battery cells 120 having a structure in which the electrode plates 131 and 133 are disposed in the body portion 122a of the electrode accommodation portion 122 and also in the space between the electrode leads 125, and configuring the height of the bus bar 141 or the height of the electrode lead 125 to be less than the outer height of the battery cell 120 while the bus bar 141 is coupled to the electrode lead 125, energy density per unit volume of the battery module 100 may be increased, and space utilization may be increased.

Also, in the embodiment, the bus bar 141 or the electrode lead 125 may not be exposed to the periphery of the battery cell 120. Therefore, in the embodiment, a space for installing the bus bar 141 in the upper portion beyond the outer height of the battery cell 120 may not be necessary, such that the height of the battery module 100 may be lowered.

In the related art pouch-type battery cell 30 (see FIGS. 4 and 5) in which the electrode leads 35 are exposed from both sides of the electrode accommodation portion 32 in the width direction, both sides of the electrode accommodation portion 32 in the width direction cannot be used to install the electrode assembly. In contrast, in the battery module 100 according to an embodiment of the present disclosure, since almost all width of the battery cell 120 except for the first bending portion 123*c* may be sufficiently utilized for the installation of the electrode plates 131 and 133, energy density of the battery cell 120 per unit volume may be increased.

Also, according to an embodiment of the present disclosure, since it is possible to implement a battery cell 120 in which a width (length) is greater than a height of the battery cell 120, it is possible to reduce the height and increase the width in configuring the battery cell 120 to implement the same energy density.

In particular, recently, battery module end users (or consumers) (e.g., automobile manufacturers) are very interested in improving vehicle driving stability that may be obtained by lowering the overall height of the battery module 200. The battery module 100 according to an embodiment of the present disclosure may lower the height of the battery cell 120, and since the height of the battery module 100 may be lowered in a state in which the bus bar assembly 140 is coupled to the battery cell 120, the overall height of the battery module 100 may be sufficiently reduced to meet the demand of the battery module 100 demanders (it is possible to lower the height of the battery module 100 similarly to a height of the battery module including a can-type battery cell).

Figure 14:
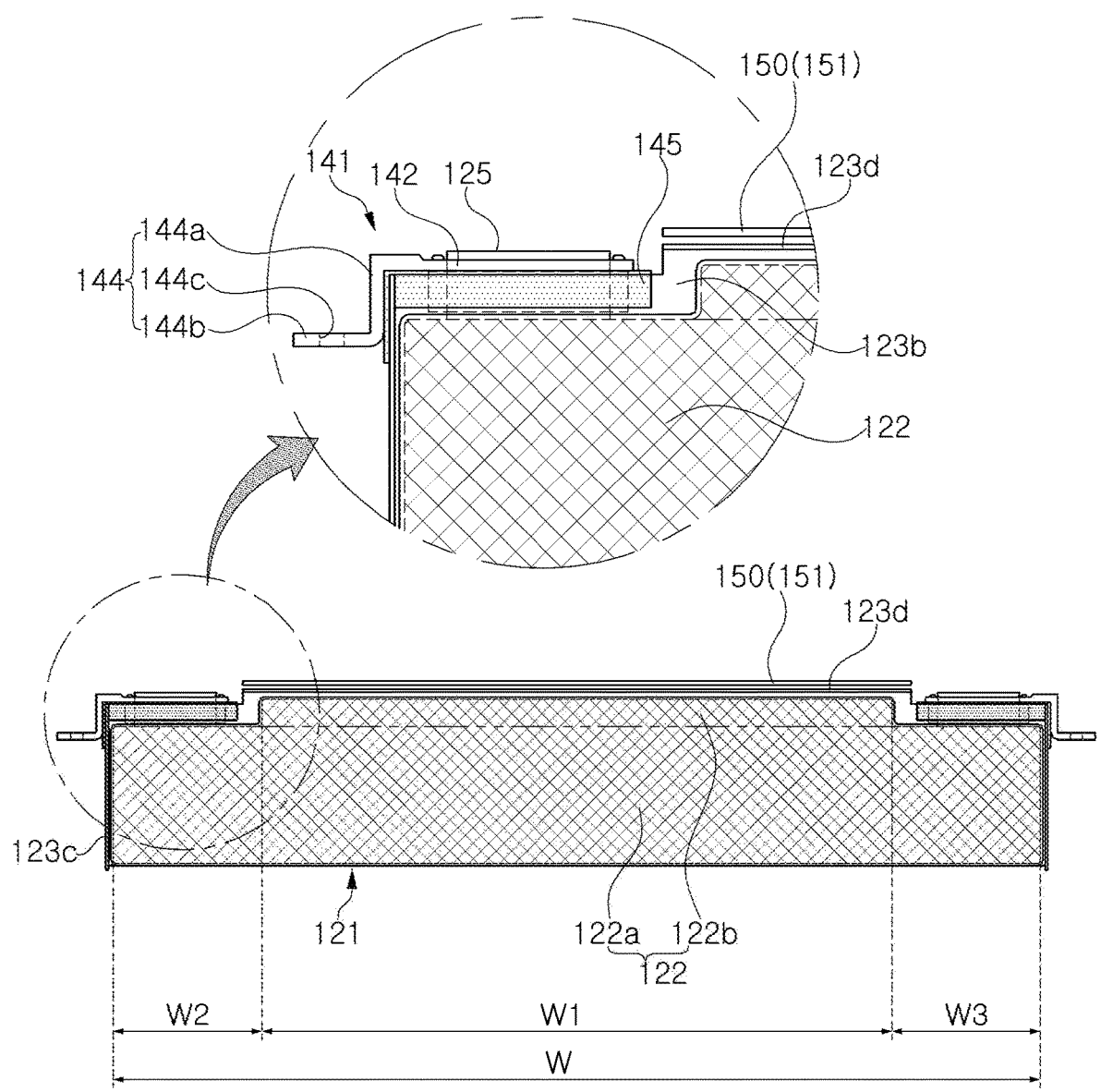
FIGS. 14 and 15 are cross-sectional views illustrating a state in which a sensing module is installed in the battery module illustrated in FIG. 13.
Figure 15:
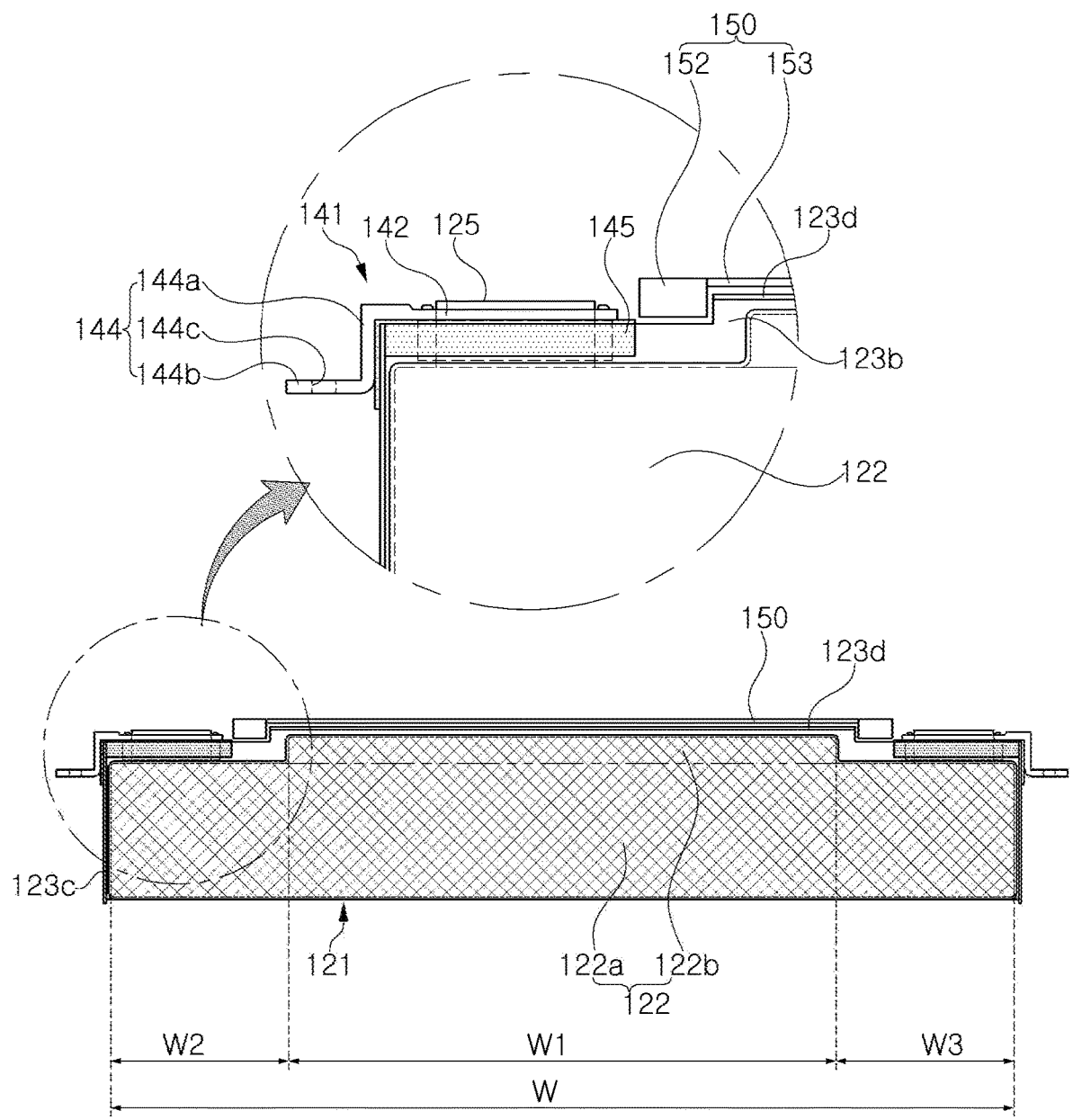

Meanwhile, the battery module 100 in the embodiment may further include a sensing module 150 as illustrated in FIGS. 14 and 15.

FIGS. 14 and 15 are cross-sectional views illustrating a state in which a sensing module is installed in the battery module illustrated in FIG. 13.

The sensing module 150 may be configured to sense at least one of a voltage and a temperature of the battery cell 120, and may be installed above the second bending portion 123*d*. The sensing module 150 may include a voltage sensor (not illustrated) for measuring the voltage of the battery cell 120 and a temperature sensor (not illustrated) for measuring the temperature of the battery cell 120. The sensing module 150 may have a structure for electrically connecting portions of the bus bar assembly 140 installed on both ends of the battery module 100 to each other. In this case, the sensing module 150 may be configured to include a flexible printed circuit board (FPCB) 151 as illustrated in FIG. 14, or a printed circuit board (PCB) 152 as illustrated in FIG. 15. The PCB 152 installed on the bus bar assembly 140 may include a voltage sensor and/or a temperature sensor, and may include a connection portion 153 which may perform electrical connection and signal transmission to connect the PCBs 152 installed on both ends of the battery module 100 to each other.

In this case, at least a portion of the sensing module 150 may be disposed in a space between the bus bar 141 and the extension portion 122*b* and may be disposed on a level lower than that of the second bending portion 123*d*. For example, as illustrated in FIG. 15, a portion of the sensing module 150, that is, at least a portion of the PCB 152, the temperature sensor, and the voltage sensor, may be configured to extend from the position above the second bending portion 123*d* to the position lower than the second bending portion 123*d*. In this case, the height of the space occupied by at least a portion of the PCB 152, the temperature sensor, and the voltage sensor of the sensing module 150 in the battery module 100 may be lowered, and accordingly, the space of the battery module 100 may be efficiently used, and the height of the battery module 100 may be lowered.

Figure 16:
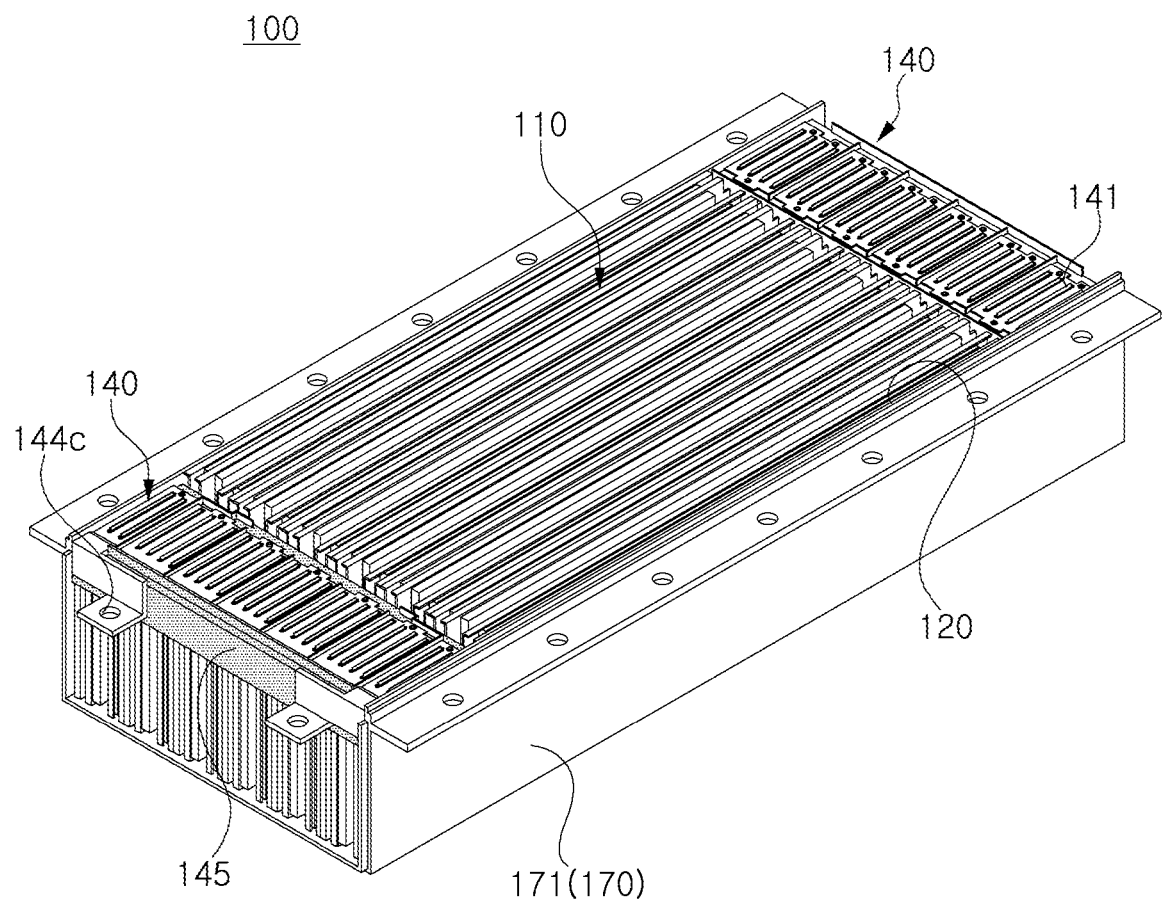
FIG. 16 is a perspective view illustrating a state in which a lower plate of a module housing is added to the battery module illustrated in FIG. 6.
Figure 17:
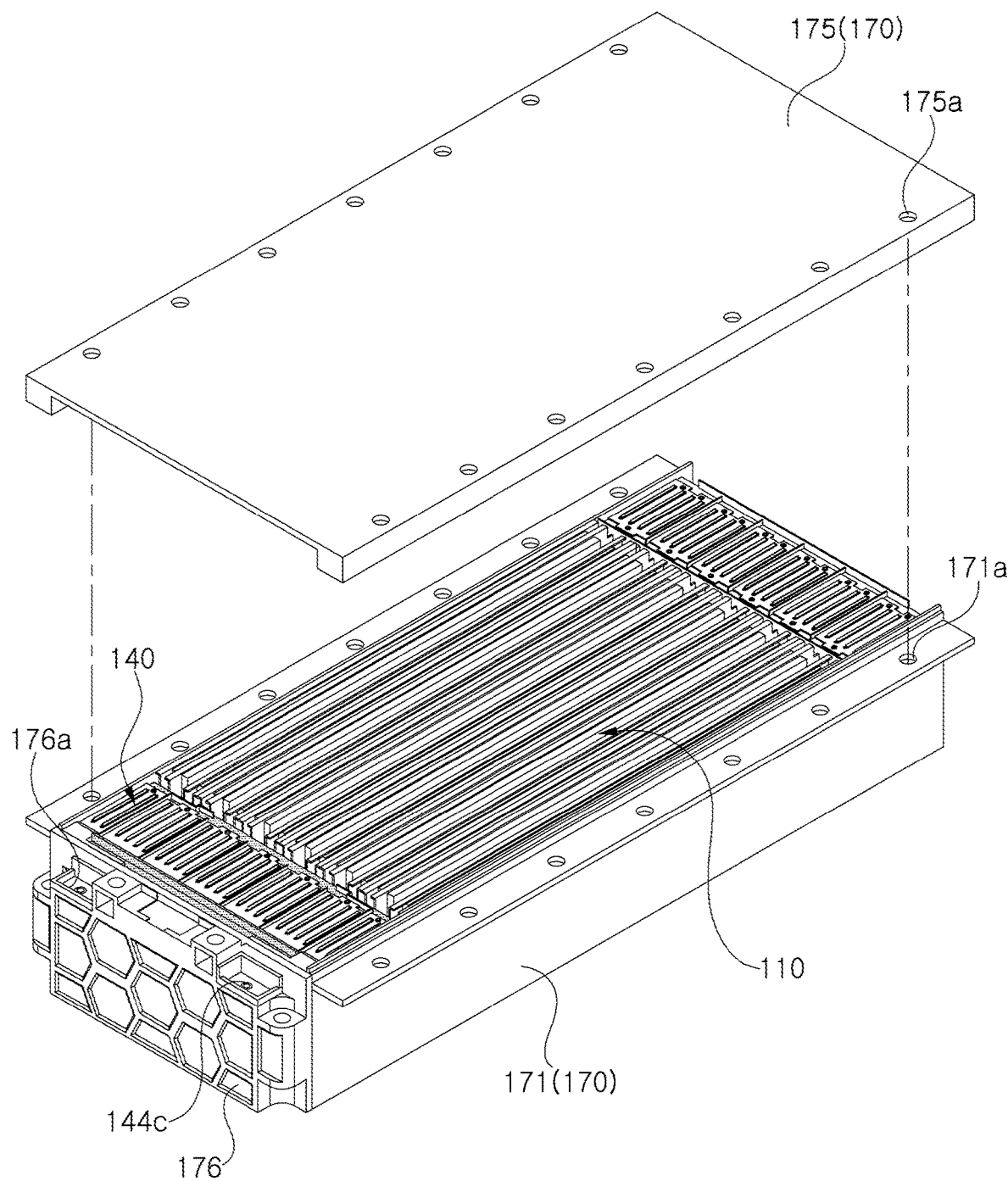
FIG. 17 is a perspective view illustrating a state in which a cover portion and at least one end plate of a module housing are added to the battery module illustrated in FIG. 16.
Figure 18:
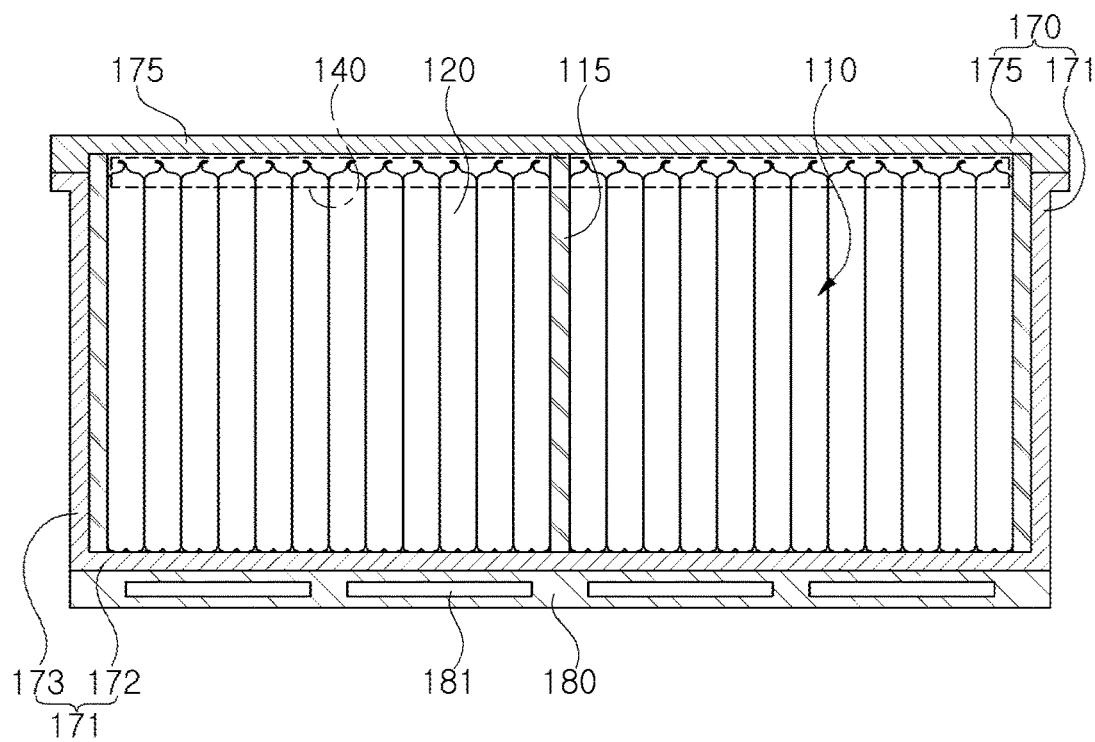
FIG. 18 is a cross-sectional view illustrating a state in which the battery module illustrated in FIG. 17 is assembled, taken in a width direction.
Figure 19:
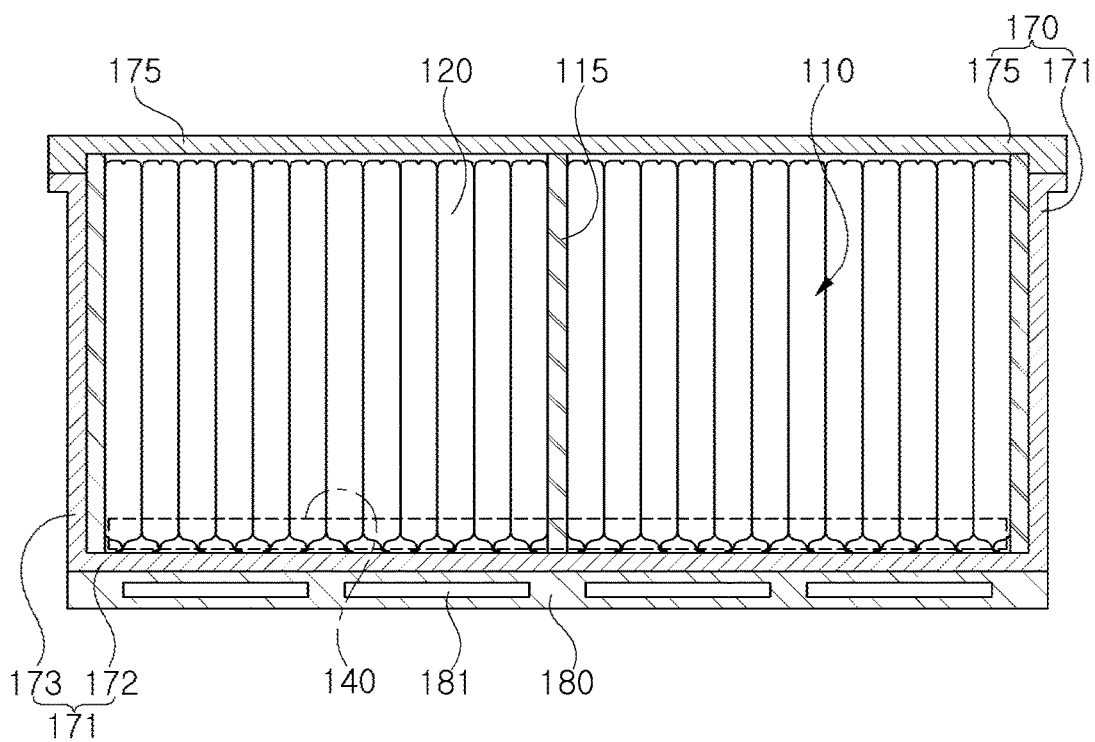
FIG. 19 is a cross-sectional view illustrating a battery module, taken in a width direction, according to another embodiment of the present disclosure.

The battery module 100 in the embodiment may further include a module housing 170 as illustrated in FIGS. 16 to 17, and as illustrated in FIGS. 18 and 19, the battery module 100 may further include the module housing 170 and a cooling member 180.

FIG. 16 is a perspective view illustrating a state in which a lower plate of a module housing 170 is added to the battery module 100 illustrated in FIG. 6. FIG. 17 is a perspective view illustrating a state in which a cover portion 175 and at least one end plate 176 of a module housing 170 are added to the battery module 100 illustrated in FIG. 16. FIG. 18 is a cross-sectional view illustrating a state in which the battery module 100 illustrated in FIG. 17 is assembled, taken in a width direction. FIG. 19 is a cross-sectional view illustrating a battery module 100 according to another embodiment of the present disclosure. In the battery module 100 illustrated in FIGS. 18 and 19, the cooling member 180 may be added to the module housing 170.

Figure 21:
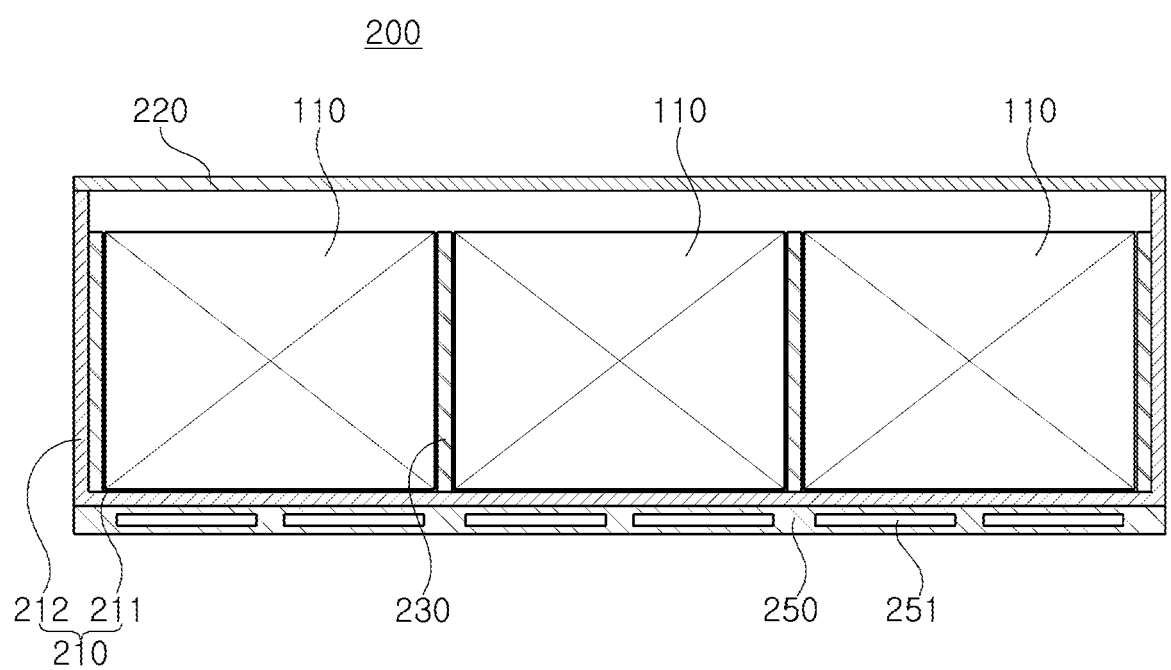
FIG. 21 is a cross-sectional view illustrating a battery pack according to another embodiment of the present disclosure.

Referring to FIGS. 16 to 18, the module housing 170 constitutes the exterior of the battery module 100 and is disposed outside the cell stack 110 formed by stacking a plurality of battery cells 120 to protect the battery cell 120 from an external environment. However, the battery module 100 according to an embodiment of the present disclosure does not necessarily include the module housing 170. For example, as illustrated in FIG. 21, the plurality of cell stacks 110 to which the bus bar assembly 140 is connected may be mounted on the battery pack 200 without disposing the module housing 170.

The module housing 170 may have a pipe shape in which internal space for accommodating the battery cell 120 is formed and two ends are open in a length direction. The module housing 170 may have a rectangular pipe shape to accommodate stacked battery cells 120. For example, the module housing 170 may have a structure in a pipe shape by coupling a lower plate 171 having a U-shaped cross-section with one side open (in the present disclosure, the U-shaped cross-section includes an round corner shape) and a cover portion 175 combined with the lower plate 171 to form an internal space accommodating the battery cell 120. Alternatively, the module housing 170 may have both end open mono-frame structure in which the lower plate 171 and the cover portion 175 are integrally formed.

Hereinafter, the module housing 170 formed by coupling the lower plate 171 and the cover portion 175 will be described as an example with reference to FIGS. 16 to 19.

The cell stack 110 is disposed in the internal space of the module housing 170, and at least one surface constituting the module housing 170 may function as a heat dissipation plate dissipating heat generated in the battery cell 120 outwardly.

Referring to FIGS. 18 and 19, the lower plate 171 may include a bottom portion 172 for supporting the lower portion of the battery cell 120 and a side wall portion 173 extending upwardly from both ends of the bottom portion 172 and supporting the side surface (the wider surface) of the battery cell 120 so as to form a U-shaped cross-sectional surface having one open side. The lower plate 171 may have a structure in which the bottom portion 172 and the sidewall portion 173 are integrated with each other. Also, a cross-sectional surface of the lower plate 171 taken in the width direction may have a constant shape in the length direction, and may be manufactured by an extrusion process. However, the lower plate 171 may be configured by configuring the side wall portion 173 and the bottom portion 172 as independent portions and combining/bonding the side wall portion 173 and the bottom portion 172, if desired.

The side wall portion 173 may extend from both ends of the bottom portion 172 taken in the width direction, and may support the side surface of the battery cell 120 to correspond to the side surface (the wider surface) of the cell stack 110 stacked in the horizontal direction. In this case, the side surface of the battery cell 120 may be in direct contact with the sidewall portion 173, but as illustrated in FIGS. 18 and 19, a heat dissipation pad or the buffer pad 115 may be interposed between the sidewall portion 173 and the side surface of the battery cell 120. The buffer pad 115 may also be partially provided between the battery cells 120. The buffer pad 115 may be formed of an elastic material to absorb the expansion of the battery cell 120 caused by swelling, and when the swelling occurs, the buffer pad 115 may be elastically deformed to buffer the force applied to the side wall portion 173, such that the deformation of the side wall portion 173 may be reduced.

The lower plate 171 is formed of a material having high thermal conductivity, like a metal. For example, the lower plate 171 may be formed of an aluminum material. However, the material of the lower plate 171 is not limited thereto, and various materials may be used as long as the material has similar strength and thermal conductivity to those of metal, even if it is not a metal.

In addition, the cover portion 175 is configured to cover the open side of the lower plate 171, that is, the upper end of the sidewall portion 173. Like the lower plate 171, the cover portion 175 may be formed of a material having high thermal conductivity, like metal, or formed of a plastic material.

Also, coupling of the lower plate 171 and the cover portion 175 may be performed through a fastening member such as a bolt/nut, a screw, etc. in fastening holes 171a and 175a as illustrated in FIGS. 16 and 17. However, the coupling of the lower plate 171 and the cover portion 175 may include, but not limited to, various methods, such as welding (e.g., laser welding, etc.) the contact surfaces of the side wall portion 173 and the cover portion 175, sliding method, or bonding.

Meanwhile, the module housing 170 may include at least one end plate 176 disposed on front and rear surfaces of the module housing 170 in a length direction to cover the open two ends. The end plate 176 is coupled to the lower plate 171 and the cover portion 175 to form an exterior of the module housing 170 together with the lower plate 171 and the cover portion 175.

A body of the end plate 176 may be formed of a metal such as aluminum and may be manufactured by a process such as die casting or extrusion/pressing. Also, the end plate 176 may have an opening 176a for exposing the connection hole 144c of the connection terminal portion 144 of the bus bar assembly 140 externally.

The end plate 176 may be coupled to the lower plate 171 and the cover portion 175 through a fixing member such as a screw or bolt. However, the coupling method of the end plate 176 is not limited thereto.

As illustrated in FIGS. 18 and 19, the cooling member 180 may be installed in the module housing 170 to cool the battery cell 120 and may allow a cooling liquid to flow.

The cooling member 180 may be disposed on the bottom portion 172 of the module housing 170 to emit the heat transferred from the battery cell 120 to the module housing 170. Alternatively, the cooling member 180 may be disposed on the cover portion 175 of the module housing 170, or may be disposed on both the bottom portion 172 and the cover portion 175.

The cooling member 180 may have a cooling passage 181 through which the cooling fluid flows. In the cooling member 180, a cooling passage 181 having penetrating structure may be formed in the cooling plate configured separately from the module housing 170, and a cooling plate may be attached to the lower surface of the bottom portion 172. Alternatively, the cooling member 180 may attach a cooling plate having a concave portion corresponding to the cooling passage 181 to the lower surface of the bottom portion 172, and a cooling passage 181 may be formed between the cooling plate and the lower surface of the bottom portion 172.

Also, the cooling member 180 may also be integrated with the bottom portion 172. That is, the internal space through which the cooling fluid may flow may be formed in the bottom portion 172, and the internal space may be used as the cooling passage 181.

As the cooling member 180, a water cooling mechanism in which a cooling liquid flows in the cooling passage 181 may be used.

As such, in the embodiment, by emitting the heat transferred from the battery cell 120 to the module housing 170 through the water cooling member 180 through which the cooling liquid flows through the cooling liquid, the battery module 100 may be cooled.

A heat transfer member (not illustrated) may be disposed or applied between the battery cell 120 and the bottom portion 172 of the module housing 170 such that heat transfer from the battery cell 120 to the module housing 170 may be easily carried out. Heat generated in the battery cell 120 may be effectively transferred to the bottom portion 172 due to the high thermal conductivity of the heat transfer member, and sufficient heat may be dissipated through the cooling member 180.

The heat transfer member may include at least a portion of thermal grease, thermal adhesive, thermally conductive epoxy, and a heat dissipation pad to facilitate heat transfer, but an embodiment thereof is not limited thereto. Also, the heat transfer member may be disposed in the form of a pad between the lower surface of the battery cell 120 and the upper surface of the bottom portion 172, or may be formed by applying the heat transfer member in a liquid or gel state. Also, the heat transfer member in the embodiment may be configured to have high insulation.

In the embodiment in FIG. 18, the bus bar assembly 140 may be disposed above the module housing 170 and the cooling member 180 may be disposed below the module housing 170, but alternatively, as in FIG. 19, the bus bar assembly 140 may be configured to be in thermally contact with the module housing 170 in which the cooling member 180 is installed, such that the bus bar assembly 140 may be cooled through the cooling member 180.

That is, as illustrated in FIG. 19, when the cooling member 180 is disposed below the module housing 170, the bus bar assembly 140 may be installed below the module housing 170 and may be in thermally contact with the module housing 170.

In this case, a heat transfer member (not illustrated) may be disposed or applied between the bus bar assembly 140 and the upper surface of the bottom portion 172 of the module housing 170. Also, since the bus bar assembly 140 is energized, the heat transfer member between the bus bar assembly 140 and the upper surface of the bottom portion 172 may be configured to have high insulation, and for example, a material having dielectric strength in the range of 10 to 30 KV/mm may be used.

Accordingly, in the embodiment, cooling and heat dissipation of the portion of the bus bar 141 generating a great deal of heat may be effectively performed.

The battery pack 200 in the embodiment will be described with reference to FIGS. 20 and 21.

Figure 20:
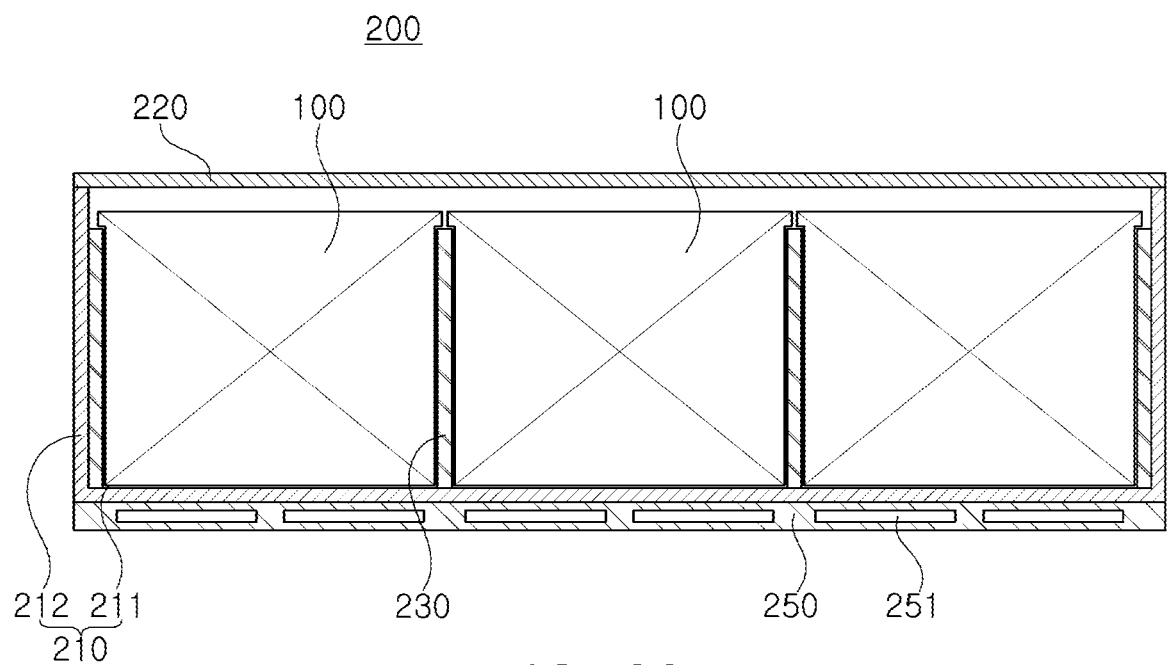
FIG. 20 is a cross-sectional view illustrating a battery pack according to an embodiment of the present disclosure.

FIG. 20 is a cross-sectional view illustrating a battery pack 200 according to an embodiment. FIG. 21 is a cross-sectional view illustrating a battery pack 200 according to another embodiment.

Referring to FIGS. 20 and 21, the battery pack 200 in the embodiment may include the battery module 100 described with reference to FIGS. 6 to 19, and the pack housing 210 in which an internal space for accommodating the plurality of battery modules 100 is formed.

The pack housing 210 may include a bottom portion 211 and a side wall portion 212 of which one side is open to mount the plurality of battery modules 100, and a cover portion 220 covering the open side. Also, a partition 230 may be provided in the pack housing 210 to support the battery module 100.

A cooling member 250 configured to allow a cooling liquid to flow through the cooling passage 251 to cool the heat generated in the battery module 100 may be disposed on the bottom 211 of the pack housing 210. When the cooling member 250 is disposed in the pack housing 210, the cooling member 180 may not be provided in the battery module 100.

A plurality of battery modules 100 may be mounted in the pack housing 210. In this case, the battery pack 200 may have a configuration in which a plurality of battery modules 100 including the module housing 170 accommodating the plurality of battery cells 120 are installed in the pack housing 210.

Differently from the above configuration, the battery pack 200 in the embodiment may have the configuration in which the plurality of battery modules 100 not including the module housing 170 or including a portion of the module housing 170 is installed in the pack housing 210. That is, the battery module 100 in a state in which at least a portion of the cell stack 110 is exposed externally may be installed in the pack housing 210.

For example, as illustrated in FIG. 6, the battery module 100 may be configured in a state in which the bus bar assembly 140 is connected to the plurality of cell stacks 110, and as illustrated in FIG. 21, the module housing may not be disposed, and the cell stack 110 may be directly mounted on the pack housing 210 while being exposed externally to the cell stack 110. In this case, the cell stack 110 may form an integrated state by attaching the battery cells 120 by a double-sided tape.

Also, as illustrated in FIG. 16, in the battery pack 200, a plurality of battery modules 100 in which the lower and side surfaces of the plurality of cell stacks 110 may be supported by the lower plate 171 and the front, rear, and upper surfaces of the cell stack 110 may be exposed may be disposed in the pack housing 210. As another modified example, as illustrated in FIG. 17, in the battery pack 200, a plurality of battery modules 100 in which the lower and side surfaces of the plurality of cell stacks 110 may be supported by the lower plate 171, and the end plate 176 may be installed on the front and rear surfaces of the cell stack 110 and an upper surface of the cell stack 110 is exposed may be installed in the pack housing 210.

As such, when the battery module 100 without disposing the module housing 170, or including only a portion of the module housing 170 is configured to be mounted on the pack housing 210, at least a portion of the volume occupied by the module housing may be reduced, such that the energy density per unit volume of the battery pack 200 may improve.

As set forth above, according to an embodiment, by stacking a plurality of battery cells having a structure in which the electrode assembly (electrode plate) is disposed in the body of the electrode accommodation portion and also in the space between the electrode leads extending from both sides of the body portion taken in the width direction in the vertical direction, and configuring the bus bar to have a height less than the outer height of the battery cell while the bus bar is coupled to the electrode lead, the energy density per unit volume of the battery module may be increased, and the space utilization of the battery module may be increased.

In particular, in the battery module including a plurality of related art pouch-type battery cell, the electrode leads are exposed in the width direction on both sides of the electrode accommodation portion in the width direction, making it impossible to use both sides of the electrode accommodation portion in the width direction to install the electrode assembly. In contrast, in the battery module according to an embodiment of the present disclosure, since almost the entire width of the battery cell excluding the bending portion is sufficiently utilized to installation of the electrode assembly, energy density of the battery cell itself per unit volume may be increased.

In addition, according to an embodiment of the present disclosure, since it is possible to implement a battery cell having a wide width in which width (length) is greater than a height, energy density and space utilization may improve, while the height of the battery cell is lowered.

Also, according to an embodiment of the present disclosure, since the electrode leads are exposed in the up-down direction from a long-width battery cell, the width of the electrode leads may be sufficiently large as compared to the related art pouch-type battery cell having a structure in which the electrode lead is exposed from the side of the casing. Therefore, according to an embodiment of the present disclosure, a cross-sectional area (width×thickness) of the electrode lead may be increased to reduce resistance occurring in the electrode lead, thereby obtaining an advantageous effect for rapid charging of battery cells, a battery module, and battery packs.

Also, according to an embodiment of the present disclosure, by disposing at least a portion of the sensing module between the extension portion of the electrode assembly and the bus bar in a position lower than the outer height of the battery cell, the space of the battery module occupied by the sensing module may be lowered, and accordingly, the space of the battery module may be efficiently used and the height of the battery module may be lowered.

Also, according to an embodiment of the present disclosure, the cooling and heat dissipation of the battery module may be performed through the water cooling member through which the cooling liquid flows. In particular, by allowing the bus bar assembly to be thermally in contact with the module housing portion, cooling and heat dissipation of the bus bar portion generating a great deal of heat may be effectively performed.

While embodiments have been shown and described above, it will be apparent to those skilled in the art that modifications and variations could be made without departing from the scope of the present disclosure as defined by the appended claims.

What is claimed is:

1. A battery module, comprising:
a plurality of pouch-type battery cells, each pouch-type battery cell including an electrode assembly, a pouch enclosing the electrode assembly, and electrode leads electrically connected to the electrode assembly, the pouch including at least one electrode accommodation portion accommodating the electrode assembly therein and a sealing portion sealing at least a portion of a periphery of the electrode accommodation portion; and
a bus bar assembly having at least one bus bar electrically connected to the electrode leads,
wherein the electrode accommodation portion includes a body portion having a width greater than a height thereof, and an extension portion extending in a height direction from the body portion and having a width less than the width of the body portion,
wherein an upper portion of the body portion comprises a first region corresponding to a central portion of the body portion taken in a width direction of the electrode accommodation portion, a second region and a third region respectively positioned on both sides of the first region taken in the width direction,
wherein the extension portion is configured to protrude from the first region of the body portion,
wherein the electrode leads comprise a positive electrode lead and a negative electrode lead,
wherein the positive electrode lead is configured to extend in the height direction out from the second region of the body portion, and the negative electrode lead is configured to extend in the height direction out from the third region of the body portion,
wherein the bus bar comprises a first bus bar connected to the electrode leads disposed at the second region and a second bus bar connected to the electrode leads disposed at the third region,
wherein the first bus bar and the second bus bar are coupled to the electrode leads in a vertical direction of the pouch-type battery cell,
wherein the sealing portion includes a first sealing portion formed on both sides of the body portion of the electrode accommodation portion taken in the width direction, and a second sealing portion formed above the electrode accommodation portion, and
wherein an outer edge of the second sealing portion includes a first outer edge line and a second outer edge line formed on both side portions of the extension portion in the width direction, respectively, a third outer edge line formed on an upper portion of the extension portion, a fourth outer edge line formed on an upper portion above the second region, and a fifth outer edge line formed on an upper portion above the third region.

2. The battery module of claim 1, wherein an upper end of the electrode leads has a height lower than an outer height of the pouch.

3. The battery module of claim 1,
wherein the bus bar includes a conductive bus bar body having a coupling hole to which the electrode leads are coupled by penetrating through the coupling hole, and
wherein the bus bar assembly further includes a support plate disposed between the bus bar body and the electrode accommodation portion, supporting the bus bar, and penetrated by the electrode leads in the vertical direction.

4. The battery module of claim 1,
wherein the first sealing portion includes a first bending portion bent at least once, and
wherein the second sealing portion includes a second bending portion bent at least once and disposed above the extension portion.

5. The battery module of claim 4, wherein the second sealing portion has a step shape formed between a portion formed at the second region of the body portion and a portion formed at an upper portion of the extension portion, and between a portion formed at the third region of the body portion and a portion formed at the upper portion of the extension portion.

6. The battery module of claim 4, wherein the electrode leads are exposed externally through the second sealing portion formed at the second region and the third region of the body portion.

7. The battery module of claim 4, wherein the bus bar has a height lower than an outer height of the second bending portion while being coupled to the electrode leads.

8. The battery module of claim 7, wherein an upper end of the electrode leads has a height lower than the outer height of the second bending portion.

9. The battery module of claim 4, wherein a sensing module for sensing at least one of a voltage or a temperature of the pouch-type battery cell is installed above the body portion, and
the sensing module is installed above the second bending portion.

10. The battery module of claim 9, wherein at least a portion of the sensing module is disposed between the bus bars and the extension portion and is disposed on a level lower than a level of the second bending portion.

11. The battery module of claim 1,
wherein the electrode assembly has a shape in which a plurality of positive and negative electrode plates are stacked with a separator interposed therebetween,
wherein each of the positive electrode plates includes a positive electrode plate extension portion extending from a width-directional central portion of the positive electrode plate in the height direction, and a positive electrode tab protruding in the height direction from a first width-directional edge of the positive electrode plate and connected to the positive electrode lead, and
wherein each of the negative electrode plates includes a negative electrode plate extension portion extending from a width-directional central portion of the negative electrode plate in the height direction, and a negative electrode tab protruding in the height direction from a second width-directional edge of the negative electrode plate and connected to the negative electrode lead.

12. The battery module of claim 1, wherein a width of the electrode accommodation portion is twice or more than a height of the electrode accommodation portion.

13. The battery module of claim 1, wherein a width of the electrode leads is equal to or greater than 20 mm and is equal to or less than ⅓ of the width of the electrode accommodation portion.

14. The battery module of claim 1, further comprising:
a module housing having an internal space for accommodating the plurality of pouch-type battery cells and having a pipe shape of which both ends taken in a length direction of the module housing are open,
wherein at least one end plate is coupled to one of open ends of the module housing.

15. The battery module of claim 14, further comprising:
a cooling member installed in the module housing for cooling the plurality of pouch-type battery cells and configured to allow a cooling liquid to flow.

16. The battery module of claim 15, wherein the bus bar assembly is configured to be in thermal contact with a portion of the module housing in which the cooling member is installed such that cooling is performed through the cooling member.

17. A battery pack, comprising:
a plurality of battery modules; and
a pack housing having an internal space for accommodating the plurality of battery modules,
wherein each battery module includes:
a plurality of pouch-type battery cells, each pouch-type battery cell including an electrode assembly, a pouch enclosing the electrode assembly, and electrode leads electrically connected to the electrode assembly, the pouch including at least one electrode accommodation portion accommodating the electrode assembly therein and a sealing portion sealing at least a portion of a periphery of the electrode accommodation portion; and
a bus bar assembly having at least one bus bar electrically connected to the electrode leads,
wherein the electrode accommodation portion includes a body portion having a width greater than a height thereof, and an extension portion extending in a height direction from the body portion and having a width less than the width of the body portion,
wherein an upper portion of the body portion comprises a first region corresponding to a central portion of the body portion taken in a width direction of the electrode accommodation portion, a second region and a third region respectively positioned on both sides of the first region taken in the width direction,
wherein the extension portion is configured to protrude from the first region of the body portion,
wherein the electrode leads comprises a positive electrode lead and a negative electrode,
wherein the positive electrode lead is configured to extend in the height direction out from the second region of the body portion, and the negative electrode lead is configured to extend in the height direction out from the third region of the body portion,
wherein the bus bar comprises a first bus bar connected to the electrode leads disposed at the second region and a second bus bar connected to the electrode leads disposed at the third region,
wherein the first bus bar and the second bus bar are coupled to the electrode leads in a vertical direction of the pouch-type battery cell,
wherein the sealing portion includes a first sealing portion formed on both sides of the body portion of the electrode accommodation portion taken in the width direction, and a second sealing portion formed above the electrode accommodation portion, and
wherein an outer edge of the second sealing portion includes a first outer edge line and a second outer edge line formed on both side portions of the extension portion in the width direction, respectively, a third outer edge line formed on an upper portion of the extension portion, a fourth outer edge line formed on an upper portion above the second region, and a fifth outer edge line formed on an upper portion above the third region.

18. The battery pack of claim 17,
wherein the battery module further includes a module housing covering at least a portion of the plurality of pouch-type battery cells, and
wherein the battery module is installed in the pack housing through the module housing.

19. The battery module of claim 1,
wherein the pouch is formed by a single casing sheet and the sealing portion is not disposed on a bottom side of the body portion of the electrode accommodation portion.

\* \* \* \* \*